United States Patent
Edmunds et al.

(10) Patent No.: US 10,802,680 B2
(45) Date of Patent: Oct. 13, 2020

(54) PIXEL-ALIGNED LAYOUT GRIDS

(71) Applicant: Adobe Inc., San Jose, CA (US)

(72) Inventors: Randall James Edmunds, San Diego, CA (US); Christopher R. Bank, Irvine, CA (US); Ashley Margaret Huang, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 260 days.

(21) Appl. No.: 15/979,969

(22) Filed: May 15, 2018

(65) Prior Publication Data

US 2019/0354247 A1    Nov. 21, 2019

(51) Int. Cl.
*G06F 40/106* (2020.01)
*G06F 3/0483* (2013.01)
*G06F 3/0484* (2013.01)
*G06F 40/14* (2020.01)

(52) U.S. Cl.
CPC ........ *G06F 3/0483* (2013.01); *G06F 3/04847* (2013.01); *G06F 40/106* (2020.01); *G06F 40/14* (2020.01)

(58) Field of Classification Search
CPC .................................................. G06F 40/106
See application file for complete search history.

(56) References Cited

U.S. PATENT DOCUMENTS

| | | | | |
|---|---|---|---|---|
| 5,271,065 A | * | 12/1993 | Rourke | G06K 15/00 358/1.18 |
| 10,019,415 B1 | * | 7/2018 | Wombell | G06F 40/14 |
| 2008/0062204 A1 | * | 3/2008 | Ramchandani | G06T 15/503 345/677 |
| 2008/0278496 A1 | * | 11/2008 | Helfman | G06T 11/206 345/441 |
| 2015/0242374 A1 | * | 8/2015 | Kong | G06F 40/106 715/201 |
| 2016/0292134 A1 | * | 10/2016 | Elings | G06F 40/131 |

OTHER PUBLICATIONS

Wyatt, "Understanding the Gutter Margin," last updated Jun. 4, 2016, p. 1-5, retrieved from https://word.tips.net/T000172_Understanding_the_Gutter_Margin.html. (Year: 2016).*

(Continued)

*Primary Examiner* — Amelia L Tapp
(74) *Attorney, Agent, or Firm* — Finch & Maloney PLLC

(57) ABSTRACT

Techniques are disclosed for generating a pixel-aligned layout grid. In some examples, a method may include receiving an input that quantifies a selected one of multiple horizontal dimensions, a number of columns, a column width, a gutter width, and a margin width, of a layout grid. The method may also include, responsive to receiving the input, calculating respective integer values for the remaining multiple horizontal dimensions based on the received input quantifying the selected one of the multiple horizontal dimensions. The method may further include generating a layout grid based on the integer values for the remaining multiple horizontal dimensions and the received input quantifying the selected one of the multiple horizontal dimensions, and rendering the generated layout grid as a pixel-aligned layout grid.

20 Claims, 14 Drawing Sheets

(56) References Cited

OTHER PUBLICATIONS

Microsoft Docs, "Alignment, margin, padding," Mar. 19, 2018, p. 1-4, retrieved from https://docs.microsoft.com/en-us/windows/uwp/design/layout/alignment-margin-padding. (Year: 2018).*

Baudel et al., "Capturing the Design Space of Sequential Space-Filling Layouts," copyright 2012 IEEE, p. 2593-2602. (Year: 2012).*

"Guideguide", Retrieved from the Internet: https://guideguide.me/, [retrieved Apr. 30, 2018], 3 pages.

"PointGrid-Sketch plugin", Retrieved from the Internet: https://www.47deg.com/blog/pointgrid/ [retrieved on Apr. 30, 2018], 5 pages.

"Grid.Guide", Retrieved from the Internet: http://grid.guide/ [retrieved on Apr. 30, 2018], 1 page.

"Pixel snapping", Retrieved from the Internet: https://guideguide.me/documentation/pixel-snapping/ [retrieved on Apr. 30, 2018], 2 pages.

\* cited by examiner

PIXEL-ALIGNED LAYOUT GRIDS

FIELD OF THE DISCLOSURE

This disclosure relates generally to layout grids for computer-based design projects, and more particularly, to pixel-aligned layout grids, including adjustment of pixel-aligned layout grids.

BACKGROUND

Designers commonly use layout grids in designing electronic documents. A layout grid is generally a set of vertical reference lines or columns that helps designers to place, position, and align content, typically on a design canvas. The structure of the lines helps a designer to manage the proportions between the elements to be aligned on the design canvas. When using the design canvas to design a webpage, for instance, the layout grid serves as a visual framework for the webpage's layout.

Some conventional design applications may assist the designer in setting the reference lines on a given design canvas by allowing the designer to input the grid dimensions. Unfortunately, these design applications typically rely on the use of floating point numbers and therefore do not allow the designer to specify or access all the parameters necessary to generate the reference lines or columns of the grid of interest. For instance, while a user may be able to specify margin width for a desired layout grid, the user cannot access or otherwise set the column width of the grid. Instead, the column width of the desired grid is auto calculated based on the other grid parameters (e.g., margin and gutter) specified by the user. This is where the use of floating values comes into play. In such cases, if a user wants a specific column width, then the user is required to indirectly back into that desired width by setting the correct margins and gutters accordingly. Such computation can be quite challenging and time consuming for many users. Further, conventional design applications perform the calculations in a manner that often results in the reference lines of the grid not being evenly aligned or not aligned on pixels, thus generating "blurry" and visually unpleasant reference lines. As a result, conventional layout grids are difficult and cumbersome to use. Moreover, conventional layout grids fail to provide a consistent design experience across multiple devices having differing screen sizes.

BRIEF DESCRIPTION OF THE DRAWINGS

The accompanying drawings are not intended to be drawn to scale. In the drawings, each identical or nearly identical component that is illustrated in various figures is represented by a like numeral, as will be appreciated when read in context.

Figure 1:
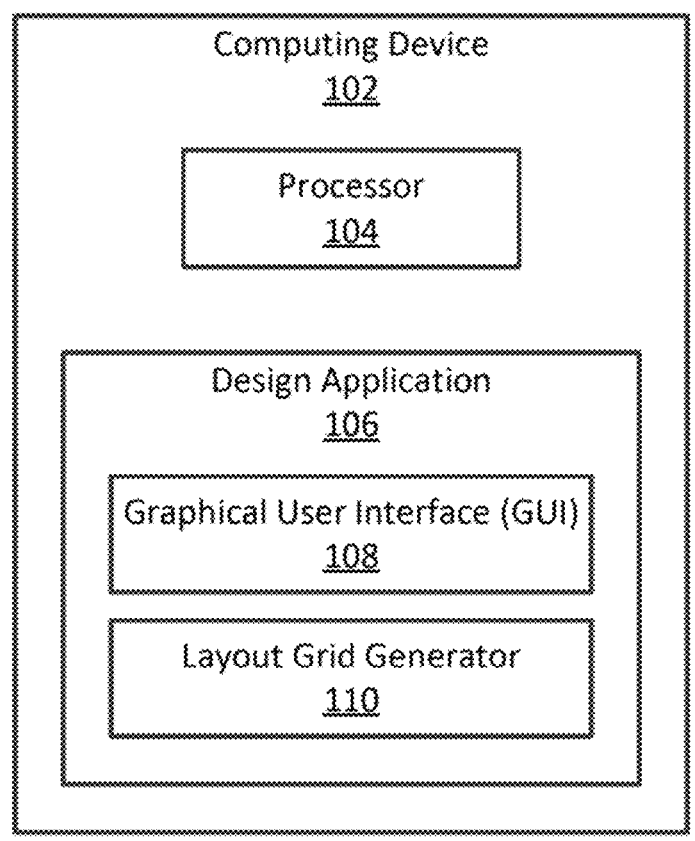
FIG. 1 is a block diagram illustrating selected components of an example layout grid system, in accordance with an embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

DETAILED DESCRIPTION

Techniques are disclosed herein for facilitating generation of a layout grid whose horizontal dimensions are integer (e.g., whole number rather than floating point) values. According to an embodiment, the layout grid is defined horizontally by a number of columns, a column width, a gutter width, and a margin width. The values for number of columns, column width, gutter width, and margin width quantify four horizontal dimensions of the layout grid. A layout grid whose aforementioned four horizontal dimensions are integer values may be rendered in a manner in which the columns of the layout grid are pixel-aligned. That is, in the case of a layout grid whose number of columns, column width, gutter width, and margin width are each quantified by respective integer values, the edges of the columns in the layout grid are aligned with or otherwise snapped to pixel locations when such a layout grid is rendered on a display.

A pixel-aligned layout grid provides a layout grid that appears sharp and crisp when rendered, for instance, on a display. In contrast, certain portions of a conventional layout grid having one or more horizontal dimensions that are non-integer or so-called floating point values may appear blurry (e.g., not sharp or crisp) when rendered. This is due to one or more of the columns of such a layout grid not being pixel-aligned when rendered. Also, in the case of a pixel-aligned layout grid, an element snapped to or aligned with a column in the layout grid also appears clear when rendered. In comparison, an element snapped to or aligned with a column that is not pixel-aligned may appear blurry when rendered. Furthermore, moving a non-pixel-aligned column to be pixel-aligned may cause the columns in the layout grid to be inconsistently spaced. To this end, the techniques provided herein endeavor to remedy such deficiencies associated with conventional techniques.

In accordance with an embodiment, a graphical user interface is provided for generating a layout grid. The user interface allows for specifying values for any of the following four dimensions or parameters: number of columns, column width, gutter width, and margin width. As will be appreciated, these dimensions horizontally define the layout grid. In an example implementation, the user interface may include respective text fields for each of the horizontal dimensions that define a layout grid. The text fields may be used by a user for specifying values for the respective horizontal dimensions, and for displaying current values of the respective horizontal dimensions. In some such implementations, the user interface may also include text fields for displaying values of other parameters or attributes of the layout grid, such as a width and a height of the layout grid and the current pixel location of an active element, to name a few examples.

In an example use case and embodiment, a user, such as a designer, may generate or adjust a layout grid by specifying a value for any of the horizontal dimensions that define the layout grid. In this case, the user may specify a value for a specific horizontal dimension without knowing or having knowledge of the values of any of the other horizontal dimensions. Responsive to a value being provided for one horizontal dimension, the values of the other horizontal dimensions may be calculated such that the horizontal dimensions of the generated layout grid are each integer values. For example, suppose a user is using a design canvas provided by a design application to generate an electronic document. Further suppose that the design application supports a layout grid feature, and the user wants to generate a layout grid to aid in generating the electronic document. To generate a layout grid, the user may specify an integer value for any one of the horizontal dimensions, for instance, a value for the column width of the layout grid the user wants to generate. In response, the design application calculates the number of columns, the gutter width, and the margin width to be each integer values (e.g., integer number for the number of columns, and integer number of pixels for the gutter width and the margin width). For instance, in one such implementation, the design application generates a layout grid having a width that is the same as the width of the design canvas. In such implementations, the design application may calculate the number of columns, the gutter width, and the margin width based on the column width specified by the user and the width of the design canvas. The design application may then render the generated layout grid on the design canvas as a pixel-aligned layout grid. Likewise, the user may specify an integer value for any one of the horizontal dimensions to adjust a rendered pixel-aligned layout grid.

The disclosed techniques significantly improve the ease and efficiency of generating and adjusting a pixel-aligned layout grid. For example, in certain embodiments, the techniques allow a user to generate, adjust, or otherwise manipulate a pixel-aligned layout grid by specifying a value for any one of the horizontal dimensions of the layout grid without having to calculate the values of the other or remaining horizontal dimensions. This is far easier and faster than conventional layout grid generation approaches which require the user to calculate or otherwise back into one or more horizontal dimensions of a layout grid before attempting to generate the layout grid. Also, by generating a layout grid that is rendered pixel-aligned, the disclosed techniques provide an improved and higher quality layout grid, as compared to existing layout grids that may not be pixel-aligned when rendered. For example, the pixel-aligned layout grid allows for quick and efficient placement or alignment of an element on pixel locations. Furthermore, the columns of the layout grid remain pixel-aligned even when the width of the layout grid is changed. In a general sense, the techniques facilitate the fast and efficient generation of a pixel-aligned layout grid, as well as the designing of electronic documents using the pixel-aligned layout grid. These and other advantages and alternative embodiments will be apparent in light of this disclosure.

As used herein, the term "pixel-aligned" refers, in addition to its plain and ordinary meaning, to a property where an edge of an object is located on pixel locations when rendered on a display. In the context of a layout grid, a column is pixel-aligned when the left edge (or vertical segment) and the right edge (or vertical segment) of the columns in the layout grid are positioned on pixel locations when the layout grid is rendered. For example, the left and right edges of a pixel-aligned column will be positioned on respective vertical lines of pixels.

FIG. 1 is a block diagram illustrating selected components of an example layout grid system 100, in accordance with an embodiment of the present disclosure. System 100 includes a computing device 102, which includes a processor 104 and a design application 106. Computing device 102 is configured to execute design application 106, which includes a graphical user interface (GUI) 108 and a layout grid generator 110. In various embodiments, additional components (not illustrated, such as a display, communication interface, etc.) or a subset of the illustrated components can be employed without deviating from the scope of the present disclosure. For instance, other embodiments may integrate the various functionalities of GUI 108 and layout grid generator 110 into fewer components (e.g., one) or more components (e.g., three or four, or more). In addition, further note that the various components of computing device 102 may all be in a stand-alone computing system according to some embodiments, while in others, may be distributed across multiple machines. For example, layout grid generator 110 may be provided in a computing system distinct from computing device 102. In a more general sense, the degree of integration and distribution of the functional component(s) provided herein can vary greatly from one embodiment to the next, as will be appreciated in light of this disclosure.

Design application 106 is generally configured to provide for generating user experience (UX) and/or user interface (UI) designs, such as webpages, websites, electronic documents, and mobile applications, to name a few examples. Design application 106 is also configured to provide the overall control of the generation, use, and operation of a pixel-aligned layout grid utilizing the services and functionality of GUI 108 and layout grid generator 110, as necessary. For instance, according to some embodiments, design application 106 may be an interface design application, such as Adobe XD, which provides a design canvas (e.g., an artboard) for use by a user, such as a designer, in designing an electronic document. In some such embodiments, the pixel-aligned layout grid as variously described herein in conjunction with GUI 108 and layout grid generator 110 may be incorporated into and provided as part of the interface design application.

GUI 108 is configured to provide a graphical user interface that allows a user to interact with design application 106. For example, the user may use GUI 108 to access a design canvas with which to design an electronic document, such as a web page or a user interface, to name two examples. The design canvas may function as a digital work surface, such as an artboard, with which the user may visually design the electronic document. As will be described in further detail below, according to some embodiments, GUI 108 is configured to provide a user interface for generating, adjusting, and otherwise manipulating a pixel-aligned layout grid as part of the design canvas. GUI 108 is also capable of displaying a rendering of a pixel-aligned layout grid.

Layout grid generator 110 is configured to perform the calculations to generate a layout grid having horizontal dimensions that are each integer values. In accordance with some embodiments of the present disclosure, layout grid generator 110 may perform the calculations to generate a layout grid upon detecting or otherwise determining an update of or an adjustment to a horizontal dimension of a layout grid, including an update of or an adjustment to the width of a layout grid. For instance, responsive to a user specifying an integer value for the number of columns to include in a layout grid, layout grid generator 110 calculates the remaining horizontal dimensions of the layout grid (e.g., column width, gutter width, and margin width) to be integer values based on the user-provided number of columns and the current width of the design canvas. Likewise, responsive to a user specifying an integer value for a gutter width, layout grid generator 110 calculates the other horizontal dimensions of the layout grid (e.g., number of columns, column width, and margin width) to be integer values based on the user-provided gutter width and the current width of the design canvas. Layout grid generator 110 may, in some instances, perform the calculations using default values for one or more of the horizontal dimensions. For instance, in the case where a layout grid is being generated for the first time, layout grid generator 110 may use respective default values for one or more of the horizontal dimensions when performing the calculations.

In some embodiments, layout grid generator 110 is configured to generate a layout grid having a width that is the same (e.g., equal) as a width of a design canvas in which the layout grid is rendered. According to one embodiment, a width of the design canvas may be expressed as follows:

$$canvaswidth = (columns * columnwidth) + ((columns - 1) * gutterwidth) + leftmargin + rightmargin$$

where canvaswidth is the width of the design canvas, columns is the number of columns in the layout grid, columnwidth is the width of each column in the layout grid, gutterwidth is the width of each gutter in the layout grid, and leftmargin and rightmargin are the width of the left margin and the right margin, respectively, in the layout grid. In such embodiments, columns may be specified in units of columns, and canvaswidth, columnwidth, gutterwidth, leftmargin, and rightmargin may each be specified in units of pixels. In some embodiments, the left margin and the right margin in a layout grid may be linked such that the left margin and the right margin are to have the same width. Linking the left and right margins to have the same width provides for centering of the layout grid. In such embodiments, the value of the horizontal dimension margin width specifies the width of the left margin and the width of the right margin. For example, a margin width of 72 pixels specifies a left margin of width 72 pixels and a right margin of width 72 pixels. Layout grid generator 110 will be further described below with respect to FIGS. 2-13.

Figure 2:
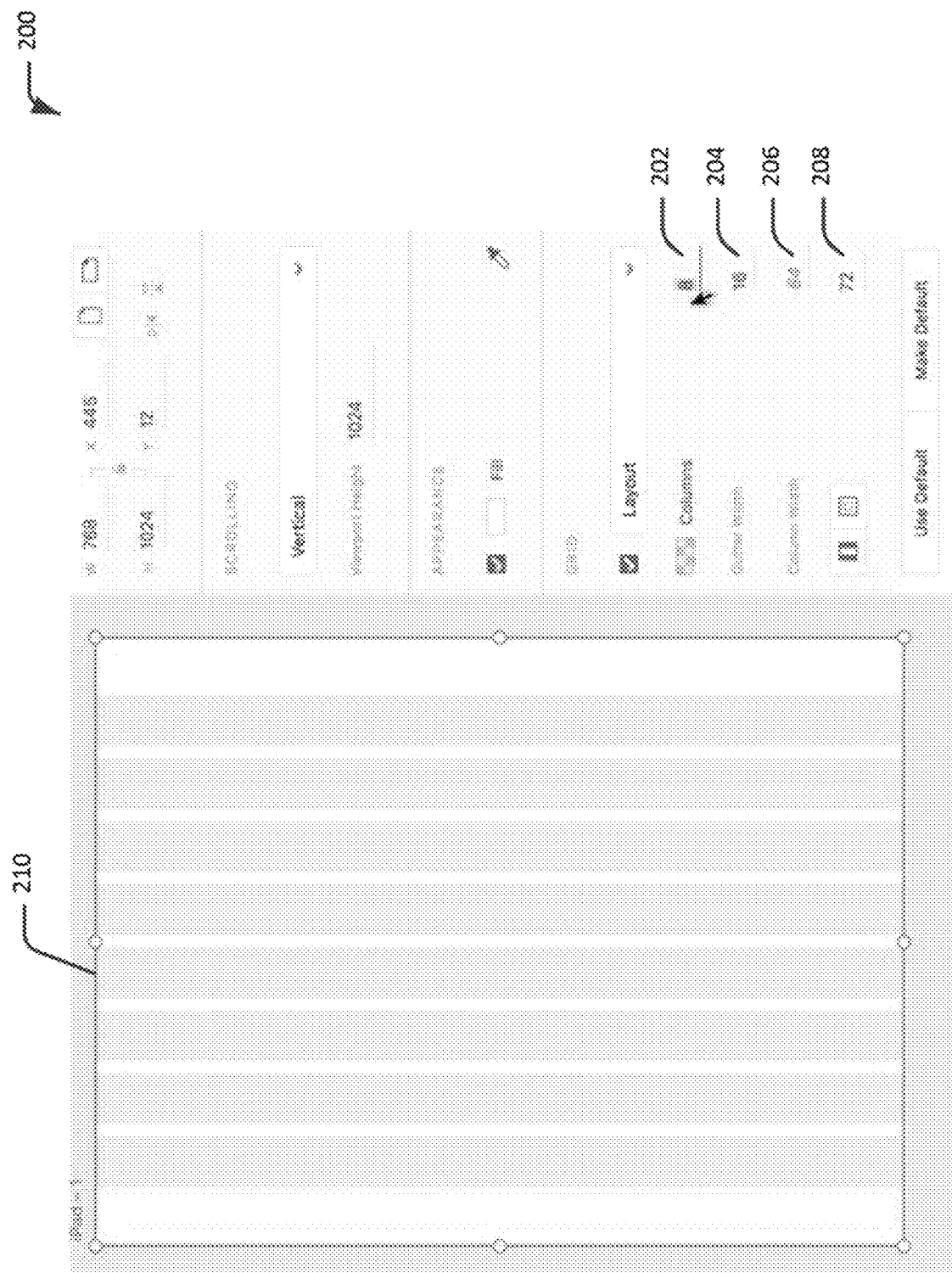
FIG. 2 illustrates a graphical user interface (GUI) for generating an example pixel-aligned layout grid, in accordance with an embodiment of the present disclosure.

FIG. 2 illustrates a GUI 200 for generating an example pixel-aligned layout grid, in accordance with an embodiment of the present disclosure. GUI 200 may be implemented as part of GUI 108 of FIG. 1. GUI 200 is configured to allow access to each of the horizontal dimensions, number of columns, column width, gutter width, and margin width, which define a layout grid. For example, a user may use GUI 200 to generate and render a pixel-aligned layout grid by specifying a value for any one of the horizontal dimensions. In an example embodiment, GUI 200 allows for specifying integer values for number of columns, column width, gutter width, and margin width, and does not allow or support entry of non-integer values. Supporting only integer values for the horizontal dimensions allows for the generation of a layout grid in which the edges of each of the specified number of columns may be aligned with or on pixel locations when the layout grid is rendered on a display. As previously discussed, such a layout grid in which the edges of its columns are aligned with pixel locations when rendered is a pixel-aligned layout grid. In other embodiments, GUI 200 may allow or support entry of both integer and non-integer values for number of columns, column width, gutter width, and margin width. In such embodiments, GUI 200 is configured to convert non-integer values to integer values. For instance, GUI 200 may convert a non-integer value to an integer value by rounding up to the next integer value.

As depicted, GUI 200 includes text fields 202, 204, 206, and 208. Text field 202 allows for specifying a value for a number of columns to include in a layout grid. Text field 204 allows for specifying value for a gutter width in the layout grid. The gutter width is the space or interval between adjacent columns in the layout grid. Text field 206 allows for specifying a value for a column width of each column in the layout grid. Text field 208 allows for specifying a value for a margin width in the layout grid. The margin width is the width of a left margin and the width of a right margin. The value specified in text field 202 indicates a number of columns, and the values specified in text fields 204, 206, and 208 each indicate a number of pixels.

In some embodiments, GUI 200 is configured to provide editing of the numerical values in text fields 202, 204, 206, and 208 using up and down arrows keys (not depicted) provided by each of text fields 202, 204, 206, and 208 or up and down arrow keys on a keyboard. For instance, depressing the up/down arrow key may increment/decrement the value in a text field to the next integer value that allows for calculating the horizontal dimensions of a layout grid to be integer values. For example, suppose the current column width is 64 pixels, and a user depresses the up arrow key to increment the column width. In this example, if the next integer value of 65 pixels does not allow the calculation of the other horizontal dimensions to be integer values, integer value 65 is not displayed in text field 206. Similarly, if the following integer value of 66 pixels also does not allow the calculation of the other horizontal dimensions to be integer values, integer value 66 is also not displayed in text field 206. Rather, the next larger integer value for the column width that allows for the calculation of the other horizontal dimensions to be integer values is displayed in text field 206. For instance, if integer value 68 is the first integer value that allows the calculation of the other horizontal dimensions to be integer values, integer value 68 is displayed in text field 206. Along with integer value 68 being displayed in text field 206, respective integer values calculated for number of columns, gutter width, and margin width are displayed in text fields 202, 204, and 208. In some embodiments, the calculation of the horizontal dimensions is performed to minimize change to the margin width.

As depicted in FIG. 2, GUI 200 includes a rendering of an example pixel-aligned layout grid 210. In some embodiments, layout grid 210 is rendered within a design canvas provided by design application 106 and, as such, is of the same width as the width of the design canvas containing layout grid 210. In GUI 200, both layout grid 210 and the containing design canvas is of a width of 768 pixels and a height of 1,024 pixels, as indicated by the text fields labeled "W" and "H", respectively, located to the upper-right of layout grid 210. For example, as depicted in FIG. 2, the width of layout grid 210 may correspond to the width of an iPad display. In an example use case and embodiment, a user wanting to generate a layout grid having eight columns may specify the integer value 8 in text field 202. The input specified in text field 202 quantifies the number of columns in the layout grid. Responsive to the integer value 8 being entered in text field 202, layout grid generator 110 may calculate the values for the other horizontal dimensions (e.g., column width, gutter width, and margin width) of the layout grid. In layout grid 210 depicted in FIG. 2, layout grid generator 110 may calculate the remaining horizontal dimensions of layout grid 210 to be a gutter width of 16 pixels as indicated by the integer value 16 in text field 204, a column width of 64 pixels as indicated by the integer value 64 in text field 206, and a margin width of 72 pixels as indicated by the integer value 72 in text field 208. As described previously, layout grid generator 110 calculates the values of the horizontal dimensions of a layout grid, for example, layout grid 210, to be integer values. Accordingly, layout grid generator 110 may render layout grid 210 as a pixel-aligned layout grid in GUI 200. For instance, layout grid 210 may be rendered in the design canvas as a pixel-aligned layout grid.

Figure 3:
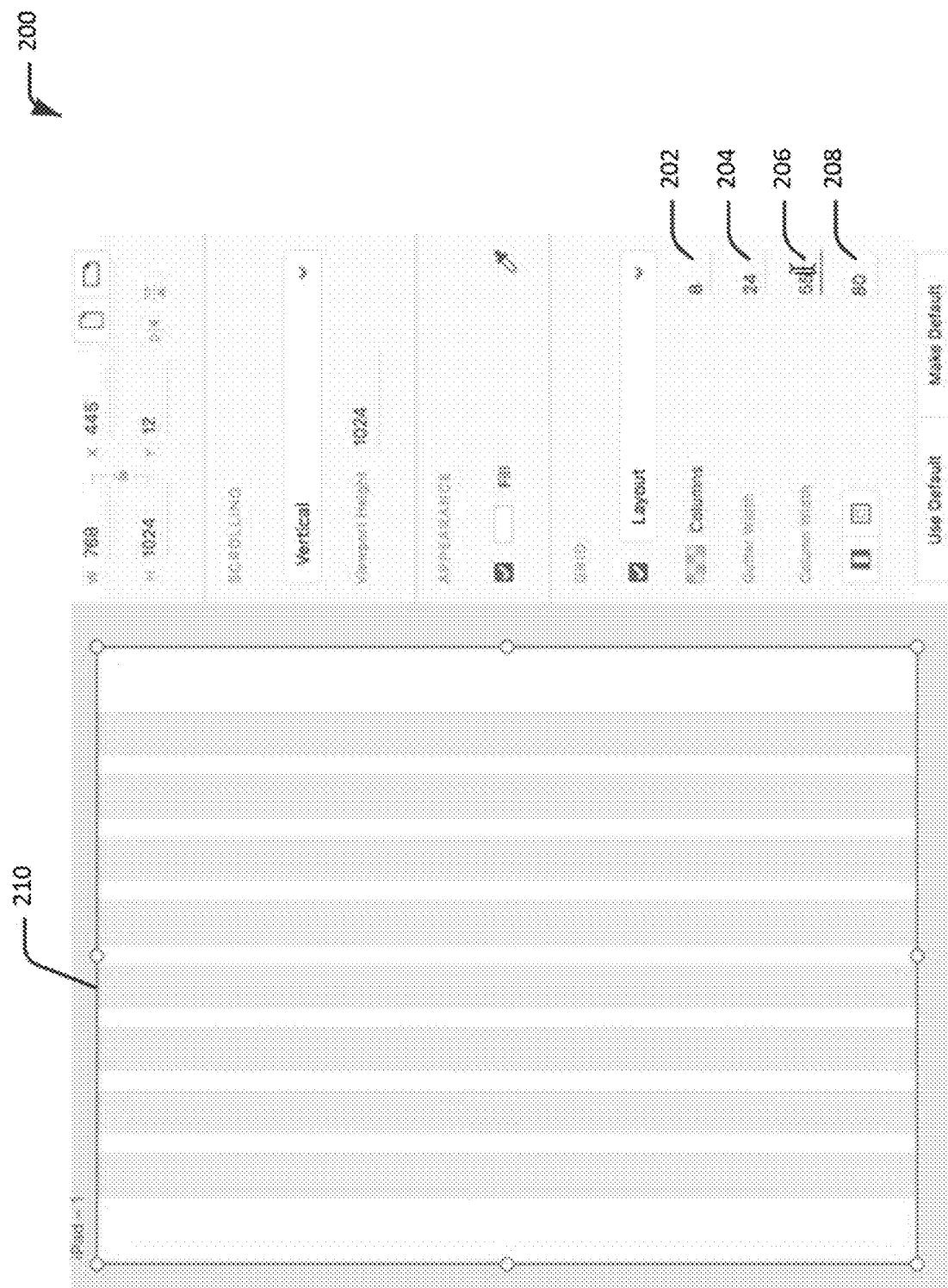
FIG. 3 illustrates the example layout grid of FIG. 2 after adjustment of various grid parameters via the GUI, in accordance with an embodiment of the present disclosure.

Continuing the example use case and embodiment, the user may want to widen the width of the gutters from 16 pixels to 24 pixels in layout grid 210 (e.g., adjust the gutter width in layout grid 210), and may specify the integer value 24 in text field 204. The input specified in text field 204 quantifies the width of each gutter in the layout grid. Responsive to the integer value 24 being entered in text field 204, layout grid generator 110 may calculate (e.g., recalculate) the values for the other horizontal dimensions of the layout grid. As depicted in FIG. 3, layout grid generator 110 may calculate the remaining horizontal dimensions of layout grid 210 to be eight columns as indicated by the integer value 8 in text field 202, a column width of 55 pixels as indicated by the integer value 55 in text field 206, and a margin width of 80 pixels as indicated by the integer value 80 in text field 208. In some embodiments, layout grid generator 110 maintains the value of the number of columns when calculating the horizontal dimensions of a layout grid. For example, as shown in layout grid 210 depicted in FIG. 3, layout grid generator 110 maintains the value of the number of columns to be eight as indicated by the integer value 8 in text field 202. In other embodiments, layout grid generator 110 may recalculate the value for the number of columns when calculating the horizontal dimensions of a layout grid. In either case, layout grid generator 110 may calculate the values of the horizontal dimensions of layout grid 210 to be integer values, and may render the revised layout grid 210 as a pixel-aligned layout grid in GUI 200. For instance, the revised layout grid 210 may be rendered in the design canvas as a pixel-aligned layout grid.

Figure 4:
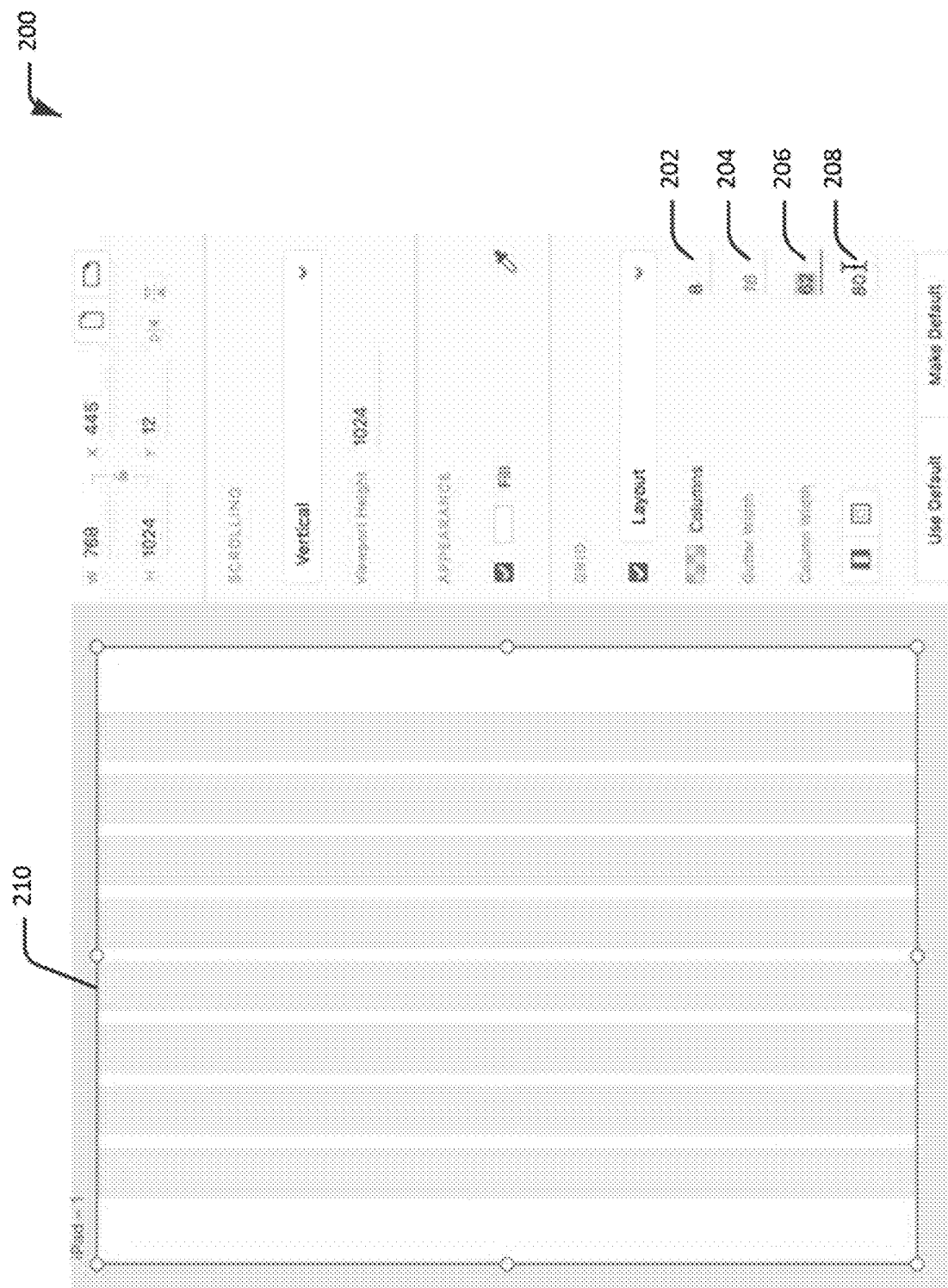
FIG. 4 illustrates the example layout grid of FIG. 2 after further adjustment of various grid parameters via the GUI, in accordance with an embodiment of the present disclosure.

Further continuing the example use case and embodiment, the user may want to widen the width of the columns from 55 pixels to 62 pixels in layout grid 210 (e.g., adjust the column width in layout grid 210), and may specify the integer value 62 in text field 206. The input specified in text field 206 quantifies the width of each column in the layout grid. Responsive to the integer value 62 being entered in text field 206, layout grid generator 110 may calculate the values for the other horizontal dimensions of the layout grid. As depicted in FIG. 4, layout grid generator 110 may calculate the remaining horizontal dimensions of layout grid 210 to be eight columns as indicated by the integer value 8 in text field 202, a gutter width of 16 pixels as indicated by the integer value 16 in text field 204, and a margin width of 80 pixels as indicated by the integer value 80 in text field 208. Layout grid generator 110 may then render the revised layout grid 210 as a pixel-aligned layout grid in GUI 200. For instance, the revised layout grid 210 may be rendered in the design canvas as a pixel-aligned layout grid. Likewise, the user may change the width of the margins (e.g., left margin and right margin) in layout grid 210 by specifying an integer value in text field 208. The input specified in text field 208 quantifies the width of each margin (e.g., the left margin and the right margin) in the layout grid. In response, layout grid generator 110 may calculate the values for the other horizontal dimensions of layout grid 210.

Figure 5:
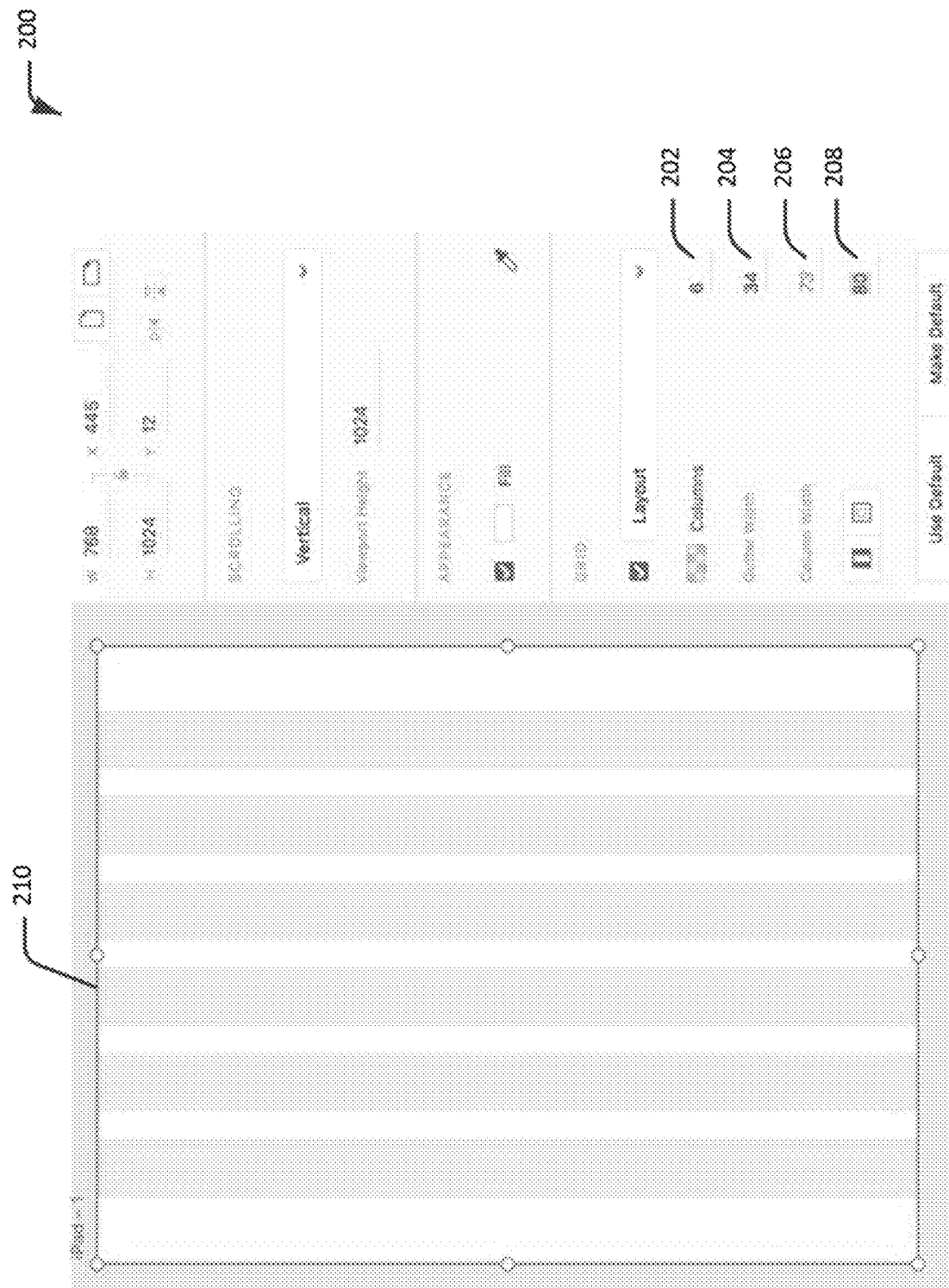
FIG. 5 illustrates another example layout grid where the GUI has been used to specify a different number of columns than the example in FIG. 2, in accordance with an embodiment of the present disclosure.

FIG. 5 illustrates another example layout grid where GUI 200 has been used to specify a different number of columns than the example in FIG. 2, in accordance with an embodiment of the present disclosure. For example, a user may have specified the integer value 6 in text field 202 in GUI 200 depicted in FIG. 4 to adjust layout grid 210. Responsive to the integer value 6 being entered in text field 202, layout grid generator 110 may calculate the values for the remaining horizontal dimensions of layout grid 210 to be a gutter width of 34 pixels as indicated by the integer value 34 in text field 204, a column width of 73 pixels as indicated by the integer value 73 in text field 206, and a margin width of 80 pixels as indicated by the integer value 80 in text field 208, as depicted in FIG. 5. Layout grid generator 110 may then render the revised layout grid 210 as a pixel-aligned layout grid in GUI 200. For instance, the revised layout grid 210 may be rendered in the design canvas as a pixel-aligned layout grid.

Figure 6:
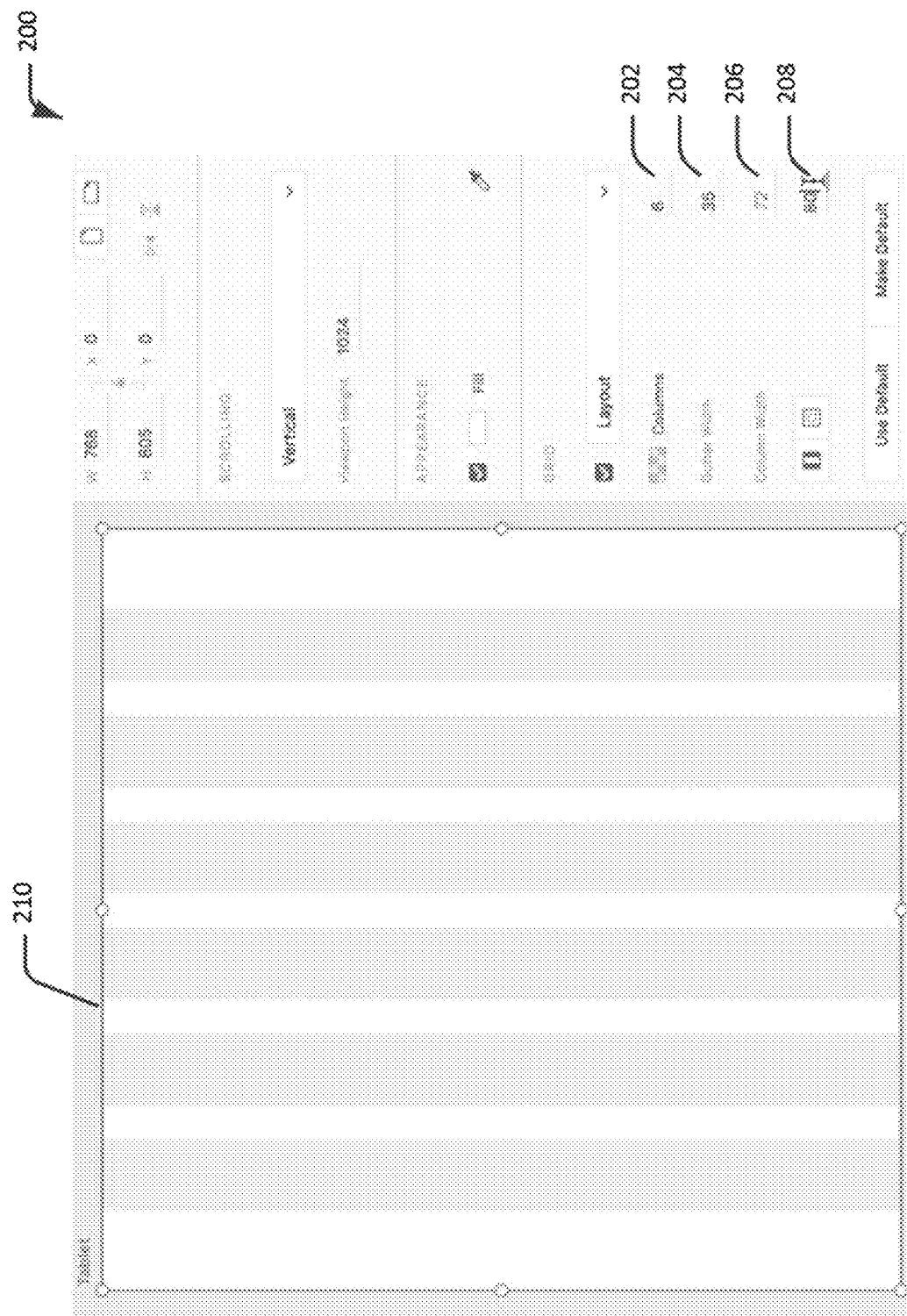
FIG. 6 illustrates another example layout grid example layout grid having a width that corresponds to the width of a display different than the one depicted in FIG. 5, in accordance with an embodiment of the present disclosure.

FIG. 6 illustrates another example layout grid 210 having a width that corresponds to the width of a display different than the one depicted in FIG. 5, in accordance with an embodiment of the present disclosure. For instance, a user may have resized layout grid 210 in GUI 200 depicted in FIG. 5 by selecting and dragging a resize handle (not depicted) provided on the design canvas containing layout grid 210. Alternatively, the user may have resized layout grid 210 in GUI 200 depicted in FIG. 5 by selecting and dragging a resize handle (not depicted) provided on layout grid 210. In this case, the width of the design canvas containing layout grid 210 may be adjusted to be the same width as the width of the resized layout grid 210. In any case, the width of layout grid 210 and/or the width of the design canvas containing layout grid 210 may be adjusted such that the widths remain the same. Responsive to the user changing the width of the layout grid 210, layout grid generator 110 may calculate the values for the horizontal dimensions of layout grid 210 to be six columns as indicated by the integer value 6 in text field 202, a gutter width of 35 pixels as indicated by the integer value 35 in text field 204, a column width of 72 pixels as indicated by the integer value 72 in text field 206, and a margin width of 80 pixels as indicated by the integer value 80 in text field 208, as depicted in FIG. 6. Layout grid generator 110 may then render the revised layout grid 210 as a pixel-aligned layout grid in GUI 200. For instance, the revised layout grid 210 may be rendered in the design canvas as a pixel-aligned layout grid. In some such embodiments, layout grid generator 110 may maintain the same number of columns in the resized layout grid as in the pre-resized layout grid to maintain the intent of the user. For instance, the user may intend to keep the same number of columns in the resized layout grid.

Figure 7:
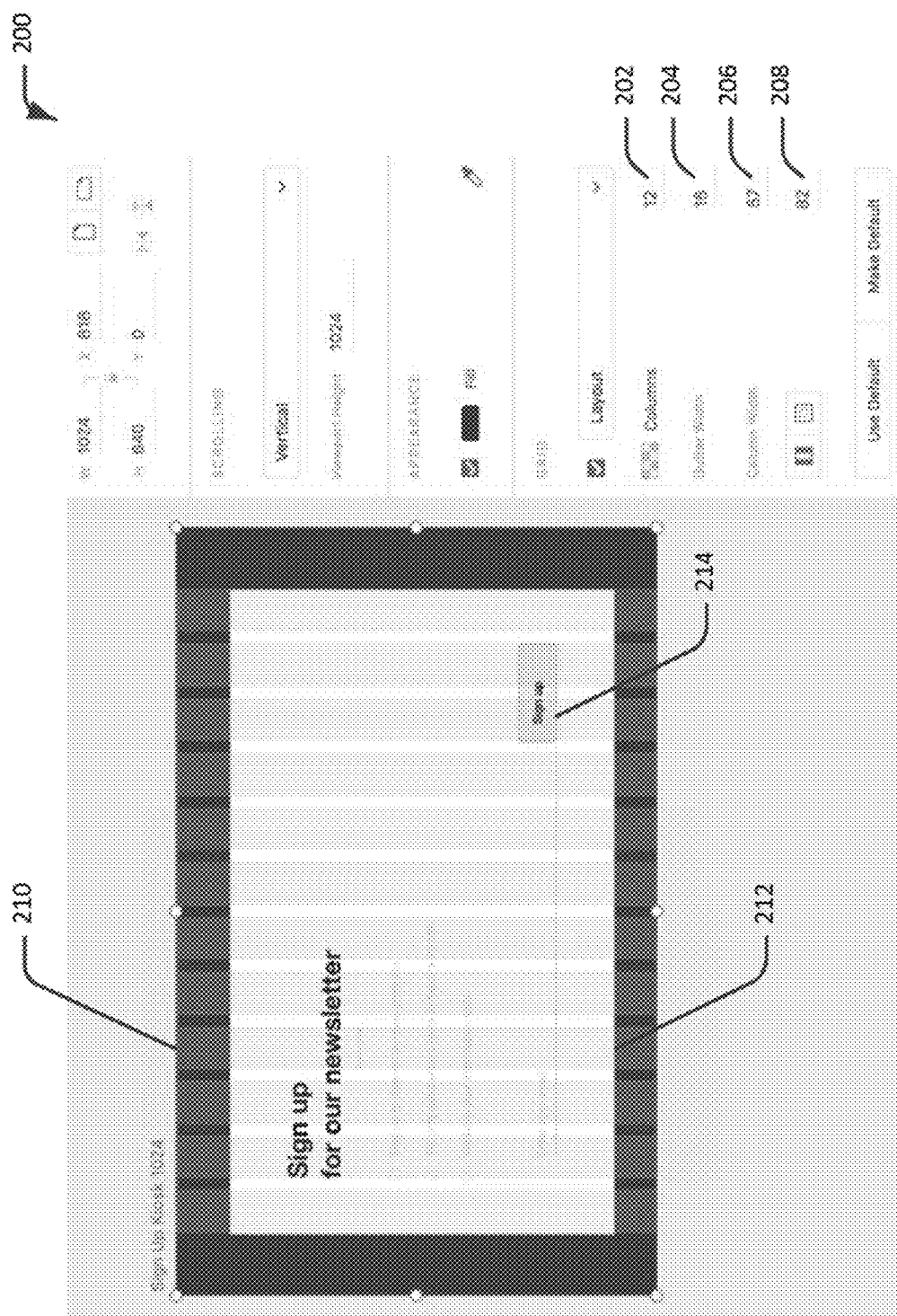
FIG. 7 illustrates another example layout grid having a width that corresponds to the width of a relatively large display, in accordance with an embodiment of the present disclosure.

FIG. 7 illustrates another example layout grid 210 having a width that corresponds to the width of a relatively large display, in accordance with an embodiment of the present disclosure. Specifically, layout grid 210 is of a width of 1024 pixels and a height of 640 pixels, as indicated by the text fields labeled "W" and "H", respectively, located to the upper-right of layout grid 210. As depicted in FIG. 7, layout grid 210 includes 12 columns as indicated by the integer value 12 in text box 202, and has a gutter width of 16 pixels as indicated by the integer value 16 in text field 204, a column width of 57 pixels as indicated by the integer value 57 in text field 206, and a margin width of 82 pixels as indicated by the integer value 82 in text field 208. Layout grid 210 may be rendered as a pixel-aligned layout grid in GUI 200. Layout grid 210 depicted in FIG. 7 also includes a design element 212 and a design element 214. Design elements 212 and 214 may, for instance, be an input control, a navigational component, an informational component, or any other user interface component. In an example implementation, design element 212 may snap to an edge of a pixel-aligned column, such as a nearest edge of a column, when placed on layout grid 210. By snapping to an edge of a pixel-aligned column in layout grid 210, the edge of design element 210 that snaps to the edge of a column may also be pixel-aligned. Pixel-aligned design element 210 appears sharp and crisp when rendered in layout grid 210. In an example embodiment, the snap feature may be a configurable feature that can be activated or deactivated. As depicted in FIG. 7, design element 214 may, for instance, be a text icon labeled "Sign Up", and be placed on or within design element 212.

Figure 8:
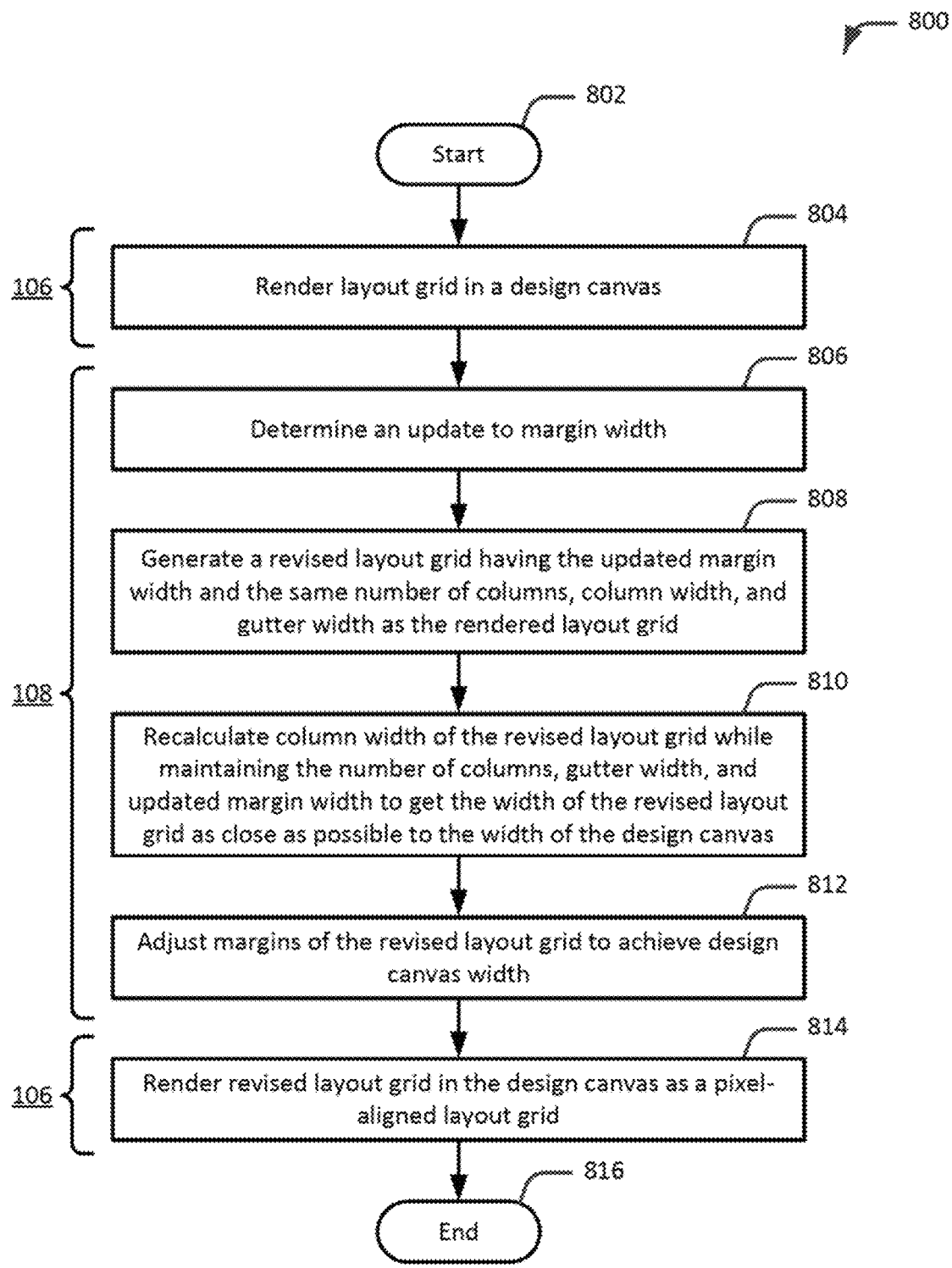
FIG. 8 is a flow diagram illustrating an example process for calculating the horizontal dimensions of a layout grid in response to an update of a margin width, in accordance with an embodiment of the present disclosure.
Figure 9:
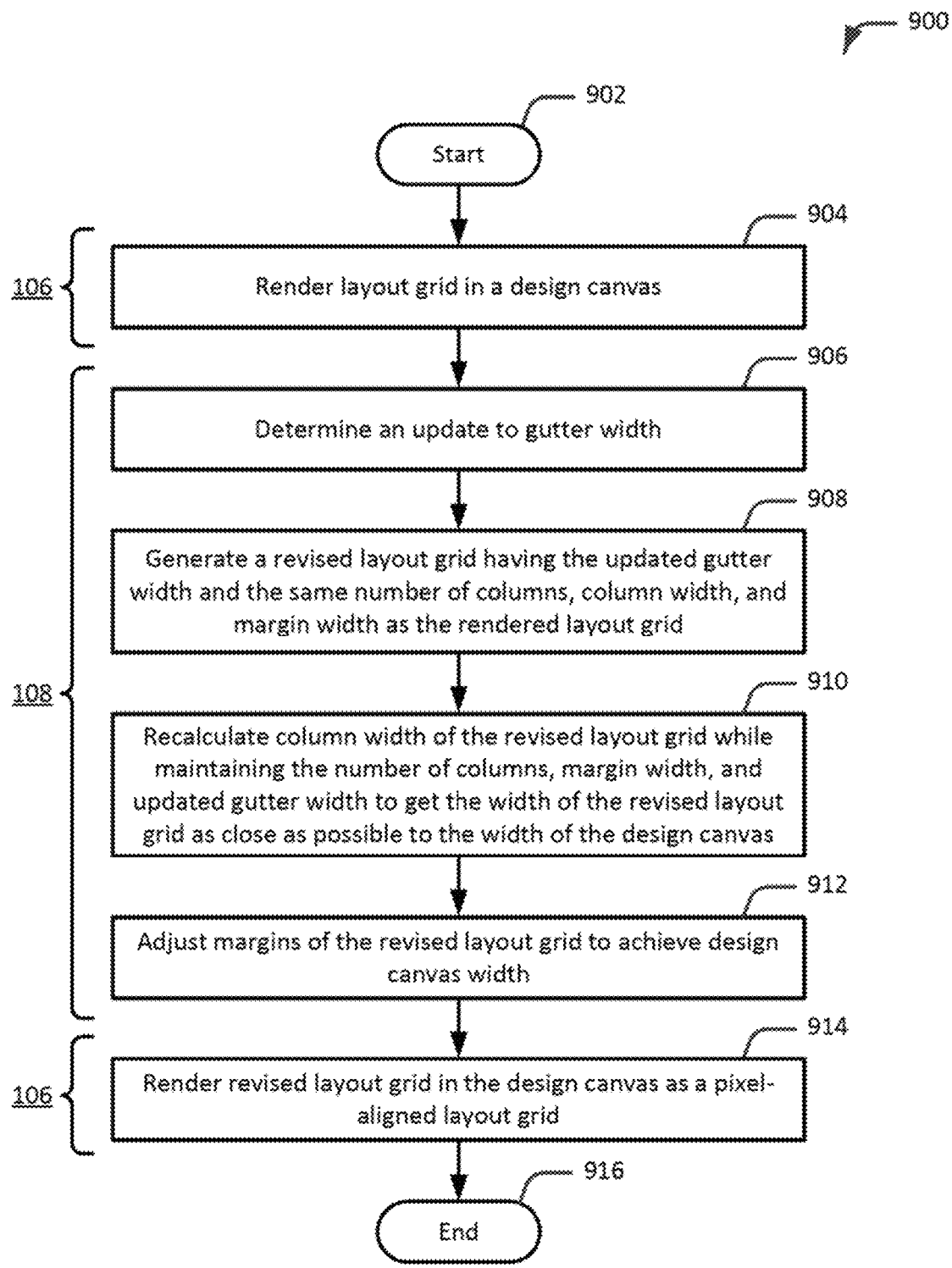
FIG. 9 is a flow diagram illustrating an example process for calculating the horizontal dimensions of a layout grid in response to an update of a gutter width, in accordance with an embodiment of the present disclosure.
Figure 10:
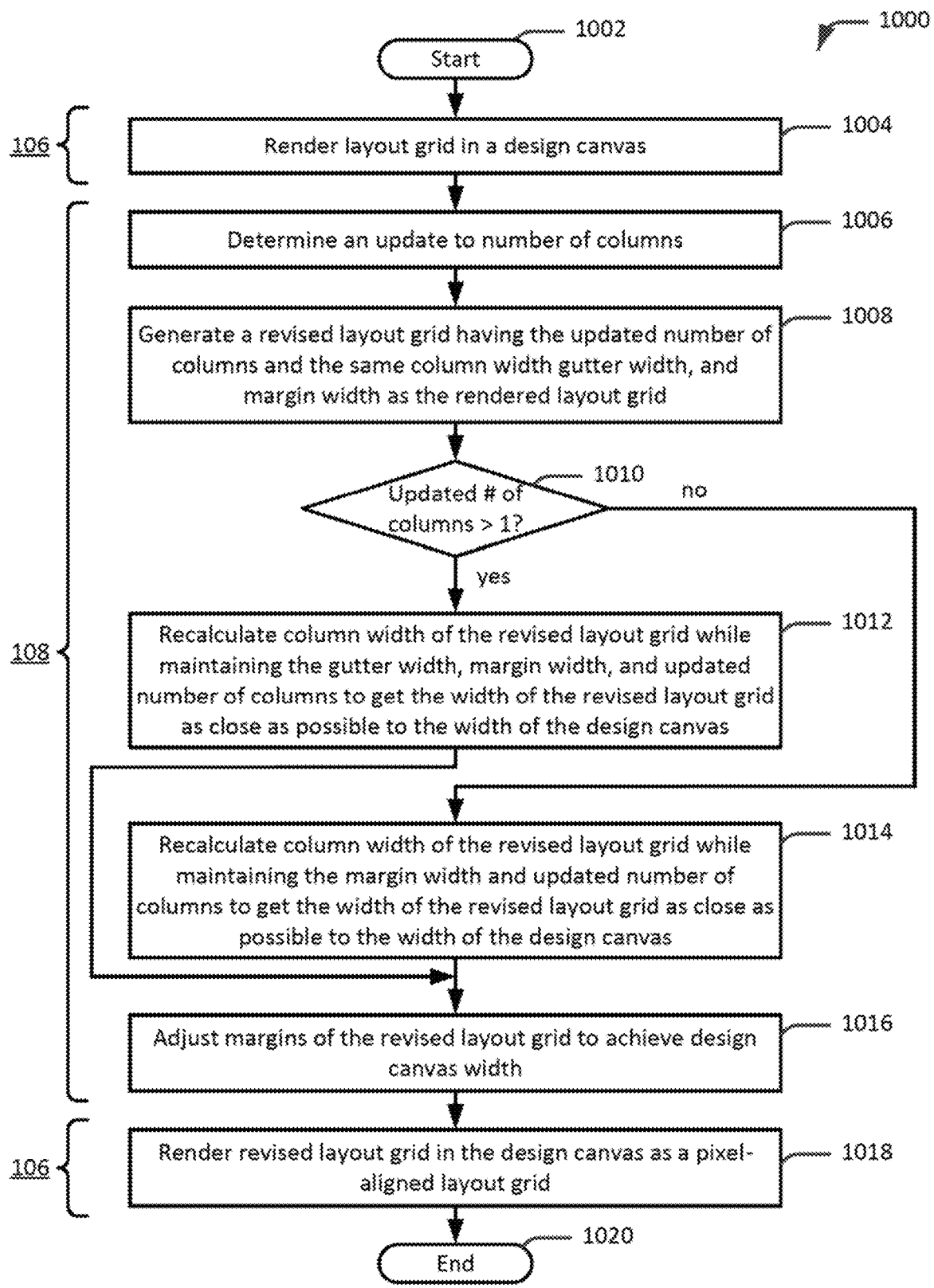
FIG. 10 is a flow diagram illustrating an example process for calculating the horizontal dimensions of a layout grid in response to an update of a number of columns, in accordance with an embodiment of the present disclosure.
Figure 11:
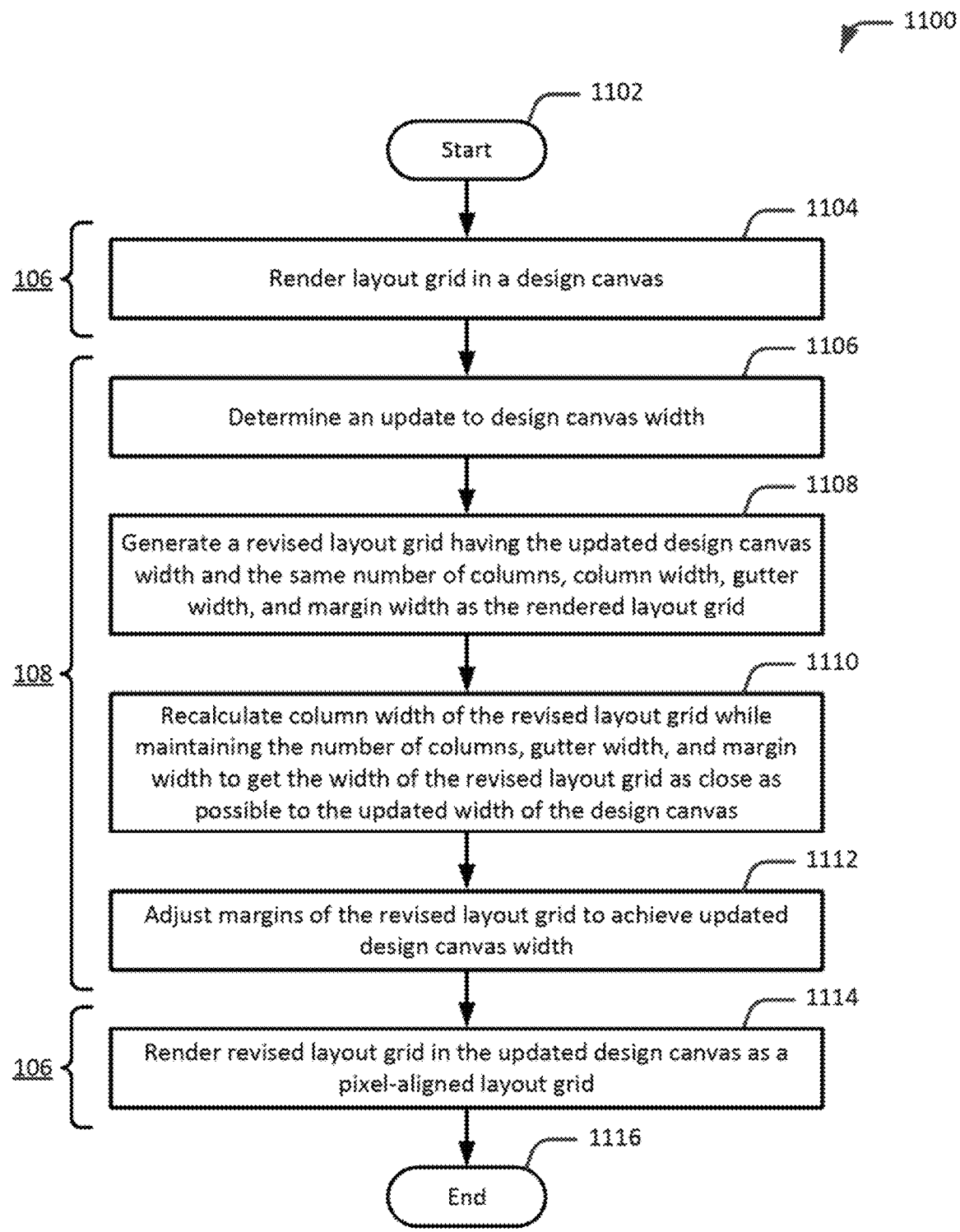
FIG. 11 is a flow diagram illustrating an example process for calculating the horizontal dimensions of a layout grid in response to an update of a design canvas width, in accordance with an embodiment of the present disclosure.
Figure 12:
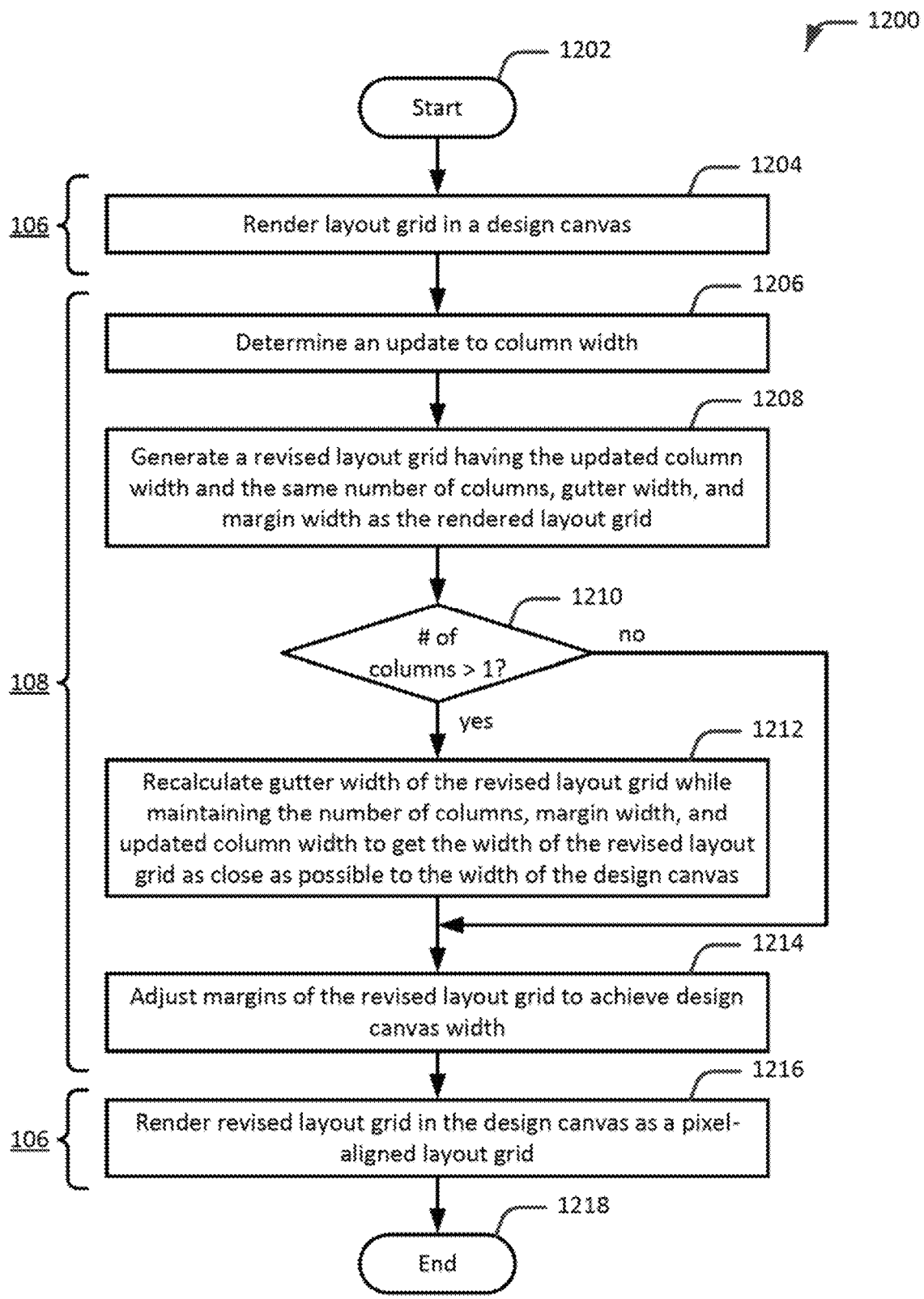
FIG. 12 is a flow diagram illustrating an example process for calculating the horizontal dimensions of a layout grid in response to an update of a column width, in accordance with an embodiment of the present disclosure.
Figure 13:
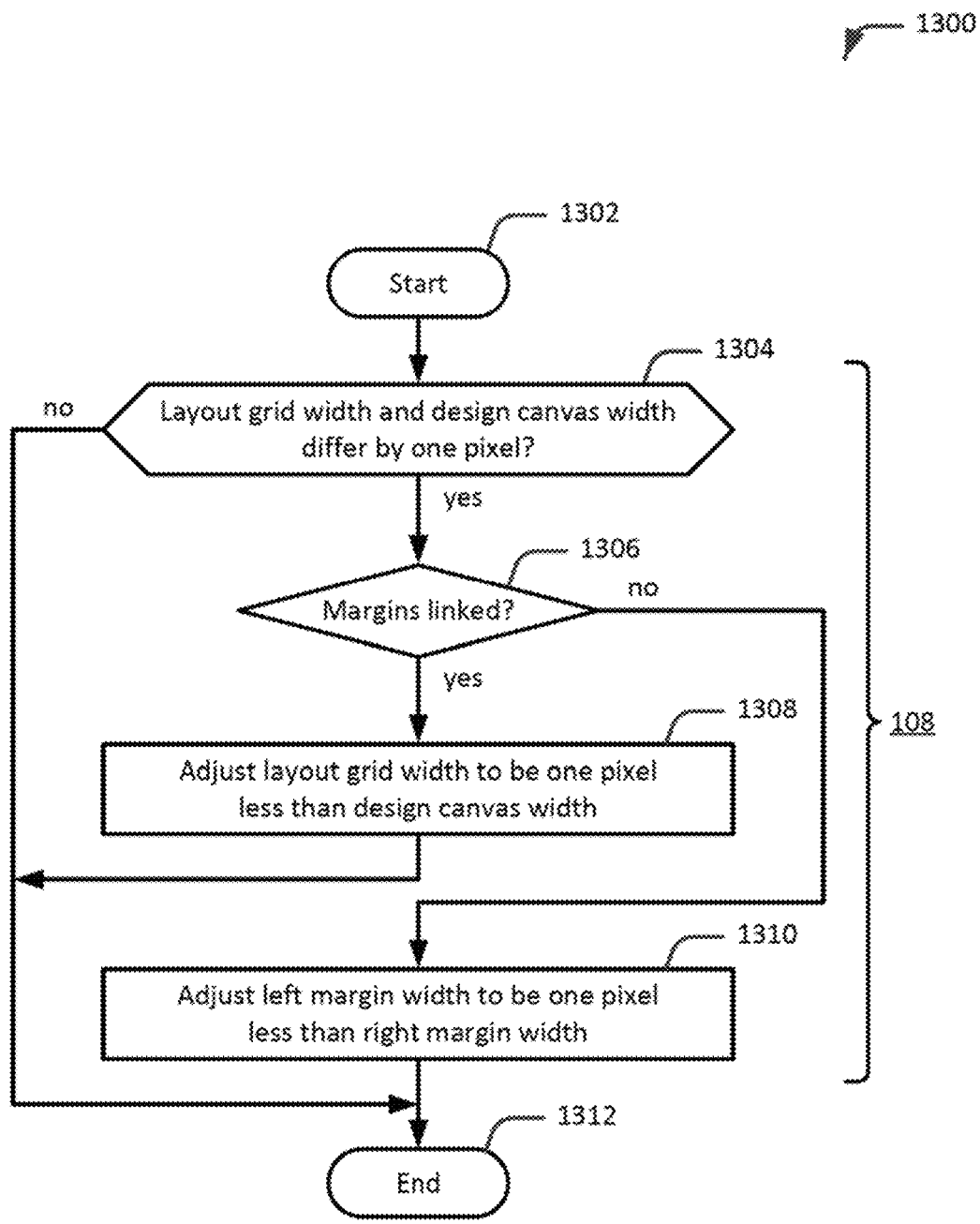
FIG. 13 is a flow diagram illustrating an example process for adjusting the margin widths of a layout grid, in accordance with an embodiment of the present disclosure.

FIG. 8 is a flow diagram illustrating an example process 800 for calculating the horizontal dimensions of a layout grid in response to an update of a margin width, in accordance with an embodiment of the present disclosure. FIG. 9 is a flow diagram illustrating an example process 900 for calculating the horizontal dimensions of a layout grid in response to an update of a gutter width, in accordance with an embodiment of the present disclosure. FIG. 10 is a flow diagram illustrating an example process 1000 for calculating the horizontal dimensions of a layout grid in response to an update of a number of columns, in accordance with an embodiment of the present disclosure. FIG. 11 is a flow diagram illustrating an example process 1100 for calculating the horizontal dimensions of a layout grid in response to an update of a design canvas width, in accordance with an embodiment of the present disclosure. FIG. 12 is a flow diagram illustrating an example process 1200 for calculating the horizontal dimensions of a layout grid in response to an update of a column width, in accordance with an embodiment of the present disclosure. FIG. 13 is a flow diagram illustrating an example process 1300 for adjusting the margin widths of a layout grid, in accordance with an embodiment of the present disclosure. The operations, functions, or actions illustrated in example processes 800, 900, 1000, 1100, 1200, and 1300 may in some embodiments be performed by layout grid system 100 and, more particularly, design application 106 of computing device 102 of FIG. 1. The operations, functions, or actions described in the respective blocks of example processes 800, 900, 1000, 1100, 1200, and 1300 may also be stored as computer-executable instructions in a non-transitory computer-readable medium, such as memory 1404 and/or data storage 1406 of a computing system 1400. In some instances, process 800, 900, 1000, 1100, 1200, and 1300 may be performed by components of computing device 102.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

With reference to FIG. 8, process 800 provides for calculating the horizontal dimensions of a layout grid in response to an update of a margin width. In an example embodiment, calculating the horizontal dimensions of a layout grid includes recalculating the column width of the layout grid while maintaining the remaining horizontal dimensions of the layout grid. Process 800 is initiated at block 802. At block 804, a layout grid may be being rendered in a design canvas as a pixel-aligned layout grid. By way of an example use case, a user may want to adjust the width of the margins in the pixel-aligned layout grid, and may specify a new value for the margin width. At block 806, an update to the margin width is detected. At block 808, a revised layout grid is generated having the updated margin width and the same number of columns, column width, and gutter width as the layout grid currently being rendered. At block 810, the column width of the revised layout grid is recalculated while maintaining the same number of columns and gutter width and the updated margin width such that the width of the revised layout grid is as close as possible to the width of the design canvas. Note that in instances where the update is an increase in the margin width, the column width may be recalculated to be a smaller integer value. Conversely, in instances where the update is a decrease in the margin width, the column width may be recalculated to be a larger integer value. In any case, the column width is recalculated to be an integer number of pixels. At block 812, the margins, for instance, the left margin and/or the right margin, of the revised layout grid are adjusted to achieve the design canvas width. For example, recalculating the width of the columns in the revised layout grid may have caused the width of the revised layout grid to be different (e.g., smaller or larger) than the width of the design canvas. In this case, the right margin, left margin, or both the right and left margins of the revised layout grid may be adjusted such that the width of the revised layout grid is the same as the width of the design canvas. Note that the margins of the revised layout grid may not need adjusting in instances where recalculating the width of the columns in the revised layout grid did not cause the width of the revised layout grid to be different than the width of the design canvas. At block 814, the revised layout grid having the updated margins and the recalculated column width is rendered in the design canvas as a pixel-aligned layout grid. Process 800 ends at block 816.

With reference to FIG. 9, process 900 provides for calculating the horizontal dimensions of a layout grid in response to an update of a gutter width. In an example embodiment, calculating the horizontal dimensions of a layout grid includes recalculating the column width of the layout grid while maintaining the remaining horizontal dimensions of the layout grid. Process 900 is initiated at block 902. At block 904, a layout grid may be being rendered in a design canvas as a pixel-aligned layout grid. By way of an example use case, a user may want to adjust the width of the gutters in the pixel-aligned layout grid, and may specify a new value for the gutter width. At block 906, an update to the gutter width is detected. At block 908, a revised layout grid is generated having the updated gutter width and the same number of columns, column width, and margin width as the layout grid currently being rendered. At block 910, the column width of the revised layout grid is recalculated while maintaining the same number of columns and margin width and the updated gutter width such that the width of the revised layout grid is as close as possible to the width of the design canvas. Note that in instances where the update is an increase in the gutter width, the column width may be recalculated to be a smaller integer value. Conversely, in instances where the update is a decrease in the gutter width, the column width may be recalculated to be a larger integer value. In any case, the column width is recalculated to be an integer number of pixels. At block 912, the margins, for instance, the left margin and/or the right margin, of the revised layout grid are adjusted to achieve the design canvas width. For example, recalculating the width of the columns in the revised layout grid may have caused the width of the revised layout grid to be different (e.g., smaller or larger) than the width of the design canvas. In this case, the right margin, left margin, or both the right and left margins of the revised layout grid may be adjusted such that the width of the revised layout grid is the same as the width of the design canvas. Note that the margins of the revised layout grid may not need adjusting in instances where recalculating the width of the columns in the revised layout grid did not cause the width of the revised layout grid to be different than the width of the design canvas. At block 914, the revised layout grid having the updated margins and the recalculated column width is rendered in the design canvas as a pixel-aligned layout grid. Process 900 ends at block 916.

With reference to FIG. 10, process 1000 provides for calculating the horizontal dimensions of a layout grid in response to an update of a number of columns. In an example embodiment, calculating the horizontal dimensions of a layout grid includes recalculating the column width of the layout grid while maintaining the remaining horizontal dimensions of the layout grid. Process 1000 is initiated at block 1002. At block 1004, a layout grid may be being rendered in a design canvas as a pixel-aligned layout grid. By way of an example use case, a user may want to adjust the number of columns in the pixel-aligned layout grid, and may specify a new value for the number off columns. At block 1006, an update to the number of columns is detected. At block 1008, a revised layout grid is generated having the updated number of columns and the same column width, gutter width, and margin width as the layout grid currently being rendered. At decision block 1010, a determination is made as to whether the updated number of columns is more than one. That is, a determination is made as to whether the value for the number of columns specified by the user is more than one. If a determination is made that the updated number of columns is more than one, then, at block 1012, the column width of the revised layout grid is recalculated while maintaining the same gutter width and margin width and the updated number of columns such that the width of the revised layout grid is as close as possible to the width of the design canvas. Otherwise, if a determination is made that the updated number of columns is not more than one, then, at block 1014, the column width of the revised layout grid is recalculated while maintaining the same margin width and the updated number of columns such that the width of the revised layout grid is as close as possible to the width of the design canvas. Note that in instances where the update is an increase in the number of columns, the column width may be recalculated to be a smaller integer value. Conversely, in instances where the update is a decrease in the number of columns, the column width may be recalculated to be a larger integer value. In any case, the column width is recalculated to be an integer number of pixels. At block 1016, the margins, for instance, the left margin and/or the right margin, of the revised layout grid are adjusted to achieve the design canvas width. For example, recalculating the width of the columns in the revised layout grid may have caused the width of the revised layout grid to be different (e.g., smaller or larger) than the width of the design canvas. In this case, the right margin, left margin, or both the right and left margins of the revised layout grid may be adjusted such that the width of the revised layout grid is the same as the width of the design canvas. Note that the margins of the revised layout grid may not need adjusting in instances where recalculating the width of the columns in the revised layout grid did not cause the width of the revised layout grid to be different than the width of the design canvas. At block 1018, the revised layout grid having the updated margins and the recalculated column width is rendered in the design canvas as a pixel-aligned layout grid. Process 1000 ends at block 1020.

With reference to FIG. 11, process 1100 provides for calculating the horizontal dimensions of a layout grid in response to an update of a design canvas width. In an example embodiment, calculating the horizontal dimensions of a layout grid includes recalculating the column width of the layout grid while maintaining the remaining horizontal dimensions of the layout grid. Process 1100 is initiated at block 1102. At block 1104, a layout grid may be being rendered in a design canvas as a pixel-aligned layout grid. By way of an example use case, a user may want to adjust the width of the design canvas to a different width. At block 1106, an update to the width of the design canvas is detected. At block 1108, a revised layout grid is generated having the same width as the width of the updated design canvas width and the same number of columns, column width, gutter width, and margin width as the layout grid currently being rendered. That is, the width of the layout grid is adjusted to be the same as the width of the updated design canvas width.

At block 1110, the column width of the revised layout grid is recalculated while maintaining the same number of columns, gutter width, and margin width such that the width of the revised layout grid is as close as possible to the updated width of the design canvas. At block 1112, the margins, for instance, the left margin and/or the right margin, of the revised layout grid are adjusted to achieve the updated design canvas width. For example, recalculating the width of the columns in the revised layout grid may have caused the width of the revised layout grid to be different (e.g., smaller or larger) than the updated width of the design canvas. In this case, the right margin, left margin, or both the right and left margins of the revised layout grid may be adjusted such that the width of the revised layout grid is the same as the updated width of the design canvas. Note that the margins of the revised layout grid may not need adjusting in instances where recalculating the width of the columns in the revised layout grid did not cause the width of the revised layout grid to be different than the updated width of the design canvas. At block 1114, the revised layout grid having the updated margins and the recalculated column width is rendered in the design canvas as a pixel-aligned layout grid. Process 1100 ends at block 1116.

With reference to FIG. 12, process 1200 provides for calculating the horizontal dimensions of a layout grid in response to an update of a column width. In an example embodiment, calculating the horizontal dimensions of a layout grid includes recalculating the gutter width of the layout grid while maintaining the remaining horizontal dimensions of the layout grid. Process 1200 is initiated at block 1202. At block 1204, a layout grid may be being rendered in a design canvas as a pixel-aligned layout grid. By way of an example use case, a user may want to adjust the width of the columns in the pixel-aligned layout grid, and may specify a new value for the column width. At block 1206, an update to the column width is detected. At block 1208, a revised layout grid is generated having the updated column width and the same number of columns, gutter width, and margin width as the layout grid currently being rendered. At decision block 1210, a determination is made as to whether the revised layout grid includes more than one column. That is, a determination is made as to whether there is more than one column in the revised layout grid. If a determination is made that the revised layout grid includes more than one column, then, at block 1212, the gutter width of the revised layout grid is recalculated while maintaining the same number of columns and margin width and the updated column width such that the width of the revised layout grid is as close as possible to the width of the design canvas. Otherwise, if a determination is made that the revised layout grid does not includes more than one column, the revised layout grid does not include a gutter and, as such, gutter width is not recalculated. Note that in instances where the update is an increase in the column width, the gutter width may be recalculated to be a smaller integer value. Conversely, in instances where the update is a decrease in the column width, the gutter width may be recalculated to be a larger integer value. In any case, the gutter width is recalculated to be an integer number of pixels. At block 1214, the margins, for instance, the left margin and/or the right margin, of the revised layout grid are adjusted to achieve the design canvas width. For example, recalculating the width of the gutters in the revised layout grid may have caused the width of the revised layout grid to be different (e.g., smaller or larger) than the width of the design canvas. In this case, the right margin, left margin, or both the right and left margins of the revised layout grid may be adjusted such that the width of the revised layout grid is the same as the width of the design canvas. Note that the margins of the revised layout grid may not need adjusting in instances where recalculating the width of the gutters in the revised layout grid did not cause the width of the revised layout grid to be different than the width of the design canvas. At block 1216, the revised layout grid having the updated margins and the recalculated gutter width is rendered in the design canvas as a pixel-aligned layout grid. Process 1200 ends at block 1218.

With reference to FIG. 13, process 1300 provides for adjusting the margin widths of a layout grid. As described previously, the margins in a layout grid may be adjusted, for instance, to achieve a layout grid width that is the same as the width of the design canvas. In such instances, the margins may need further adjustment even after the initial adjustment to the margins, for instance, in cases where the width of the layout grid and the width of the design canvas differ by one pixel. As also described previously, the left and right margins in a layout grid may be linked such that the left margin and the right margin are to have the same width. In instances where the left and right margins are linked and the width of the layout grid and the width of the design canvas differ by one pixel, the link between the margins is maintained and the width of the layout grid may be adjusted to be one pixel less than the width of the design canvas. Conversely, in instances where the left and right margins are not linked and the width of the layout grid and the width of the design canvas may differ by one pixel, the link between the margins is broken (e.g., the width of either the left margin or the right margin is further adjusted such that the widths of the margins differ by one pixel) and the width of the layout grid may be adjusted to be the same as the width of the design canvas. In any case, the horizontal dimensions (number of columns, column width, gutter width, left margin width, and right margin width) of the layout grid are integer values. Process 1300 is initiated at block 1302. At decision block 1304, a determination is made as to whether the width of the layout grid and the width of the design canvas differ by one pixel. If a determination is made that the width of the layout grid and the width of the design canvas differ by one pixel, then, at decision block 1306, a determination is made as to whether the margins in the layout grid are linked. If a determination is made that the margins in the layout grid are linked, then, at block 1308, the width of the layout grid is adjusted to be one pixel less (e.g., smaller) than the width of the design canvas. Note that the widths of the left and right margins in the layout grid are maintained to be the same. Further note that adjusting the width of the layout grid to be one pixel less than the width of the design canvas allows for rendering of the layout grid in the design canvas as a pixel-aligned layout grid. Otherwise, if a determination is made that the margins in the layout grid are not linked, then, at block 1310, the width of the left margin is adjusted to be one pixel less than the width of the right margin. In some embodiments, the width of the right margin may be adjusted to be one pixel less than the width of the left margin. In any case, note that the widths of the layout grid and the design canvas are maintained to be the same. Further note that adjusting the width of the left margin to be one pixel less than the width of the right margin allows for rendering of the layout grid in the design canvas as a pixel-aligned layout grid. Otherwise, if at decision block 1304, a determination is made that the width of the layout grid and the width of the design canvas does not differ by one pixel, no further adjustments are made to either the width of the layout grid or the width of a margin, for example, the left margin. In this case, the width of the layout grid is the same as the width of the design canvas, and additional adjustment is not needed. Process 1300 ends at block 1312.

Figure 14:
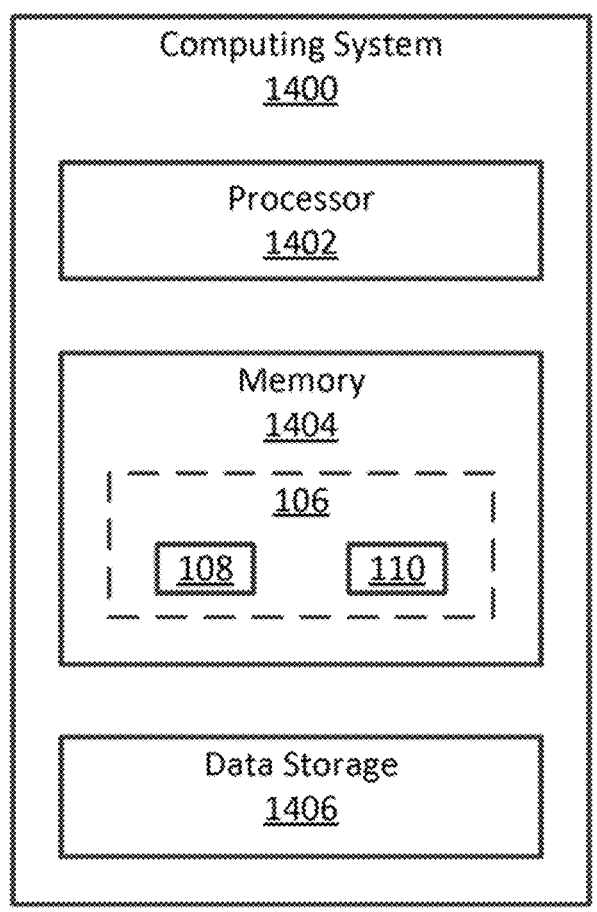
FIG. 14 is a block diagram illustrating selected components of an example computing system that may be used to perform any of the techniques as variously described in the present disclosure, according to an embodiment.

FIG. 14 is a block diagram illustrating selected components of an example computing system 1400 that may be used to perform any of the techniques as variously described in the present disclosure, according to an embodiment. In some embodiments, computing system 1400 may be configured to implement or direct one or more operations associated with some or all of the engines, components and/or modules associated with design application 106 of FIG. 1. For example, design application 106, including GUI 108 and layout grid generator 110, or any combination of these may be implemented in and/or using computing system 1400. In one example case, for instance, each of design application 106, GUI 108, and layout grid generator 110 is loaded in memory 1404 and executable by a processor 1402. Computing system 1400 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), or other form of computing or telecommunications device that is capable of communication and that has sufficient processor power and memory capacity to perform the operations described in this disclosure. A distributed computational system may be provided that includes a multiple of such computing devices. As depicted, computing system 1400 may include processor 1402, memory 1404, and data storage 1406. Processor 1402, memory 1404, and data storage 1406 may be communicatively coupled.

In general, processor 1402 may include any suitable special-purpose or general-purpose computer, computing entity, or computing or processing device including various computer hardware, firmware, or software modules, and may be configured to execute instructions, such as program instructions, stored on any applicable computer-readable storage media. For example, processor 1402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 14, processor 1402 may include any number of processors and/or processor cores configured to, individually or collectively, perform or direct performance of any number of operations described in the present disclosure. Additionally, one or more of the processors may be present on one or more different electronic devices, such as different servers.

In some embodiments, processor 1402 may be configured to interpret and/or execute program instructions and/or process data stored in memory 1404, data storage 1406, or memory 1404 and data storage 1406. In some embodiments, processor 1402 may fetch program instructions from data storage 1406 and load the program instructions in memory 1404. After the program instructions are loaded into memory 1404, processor 1402 may execute the program instructions.

For example, in some embodiments, any one or more of the engines, components and/or modules of layout grid system 100 may be included in data storage 1406 as program instructions. Processor 1402 may fetch some or all of the program instructions from data storage 1406 and may load the fetched program instructions in memory 1404. Subsequent to loading the program instructions into memory 1404, processor 1402 may execute the program instructions such that the computing system may implement the operations as directed by the instructions.

In some embodiments, virtualization may be employed in computing device 1400 so that infrastructure and resources in computing device 1400 may be shared dynamically. For example, a virtual machine may be provided to handle a process running on multiple processors so that the process appears to be using only one computing resource rather than multiple computing resources. Multiple virtual machines may also be used with one processor.

Memory 1404 and data storage 1406 may include computer-readable storage media for carrying or having computer-executable instructions or data structures stored thereon. Such computer-readable storage media may include any available media that may be accessed by a general-purpose or special-purpose computer, such as processor 1402. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 1402 to perform a certain operation or group of operations.

Modifications, additions, or omissions may be made to computing system 1400 without departing from the scope of the present disclosure. For example, in some embodiments, computing system 1400 may include any number of other components that may not be explicitly illustrated or described herein.

As indicated above, the embodiments described in the present disclosure may include the use of a special purpose or a general purpose computer (e.g., processor 1402 of FIG. 14) including various computer hardware or software modules, as discussed in greater detail herein. As will be appreciated, once a general purpose computer is programmed or otherwise configured to carry out functionality according to an embodiment of the present disclosure, that general purpose computer becomes a special purpose computer. Further, as indicated above, embodiments described in the present disclosure may be implemented using computer-readable media (e.g., memory 1404 of FIG. 14) for carrying or having computer-executable instructions or data structures stored thereon.

Numerous example variations and configurations will be apparent in light of this disclosure. According to some examples, computer-implemented methods to generate a pixel-aligned layout grid are described. An example computer-implemented method may include: causing a first layout grid to render on a display; receiving a first user input, wherein the first user input specifies a value for one or more but not all of at least four horizontal dimensions of the first layout grid, the four horizontal dimensions including a number of columns in the first layout grid, a column width of each column in the first layout grid, a gutter width of each gutter in the first layout grid, and a margin width of the first layout grid; and responsive to receiving the first user input, calculating respective integer values for the remaining one of the horizontal dimensions based on the first user input, such that each of the values for the four horizontal dimensions is an integer value; generating a second layout grid based on the integer values for the four horizontal dimensions; and causing the second layout grid to render on the display as a pixel-aligned layout grid.

In some examples, the received first user input quantifies number of columns, and the calculated respective integer values quantify column width, gutter width, and margin width. In other examples, the received first user input quantifies column width, and the calculated respective integer values quantify number of columns, gutter width, and margin width. In still other examples, the received first user input quantifies gutter width, and the calculated respective integer values quantify number of columns, column width, and margin width. In yet other examples, the received first user input quantifies margin width, and the calculated respective integer values quantify number of columns, column width, and gutter width. In further examples, the second layout grid is caused to render in a design canvas, and the method may also include: receiving a second user input that resizes a width of the design canvas; and responsive to receiving the second user input, calculating respective integer values for the four horizontal dimensions based on the resized width of the design canvas, such that each of the values for the four horizontal dimensions is an integer value; generating a third layout grid based on the calculated values for the four horizontal dimensions; and causing the third layout grid to render in the resized design canvas as a pixel-aligned layout grid. In still further examples, the first layout grid includes a left margin and a right margin, and wherein a width of the left margin and a width of the right margin being the same as the margin width. In yet further examples, the first layout grid includes a left margin and a right margin, and wherein a width of the left margin and a width of the right margin being different by one pixel, and further wherein one of the width of the left margin or the width of the right margin being the same as the margin width.

According to some examples, computer program products including one or more non-transitory machine-readable mediums encoded with instructions that when executed by one or more processors cause a process to be carried out to generate a pixel-aligned layout grid are described. An example process may include: causing a first layout grid to render in a graphical user interface (GUI), wherein the GUI comprises multiple text fields for specifying values for multiple horizontal dimensions of the first layout grid, the multiple horizontal dimensions including a number of columns in the first layout grid, a column width of each column in the first layout grid, a gutter width of each gutter in the first layout grid, and a margin width of the first layout grid; receiving a first input via the GUI, wherein the first input specifies a value for a selected one of the multiple horizontal dimensions; and responsive to receiving the first input, calculating respective values for the remaining multiple horizontal dimensions based on the first input value for the selected one of the multiple horizontal dimensions such that values for each of the multiple horizontal dimensions is an integer value; generating a second layout grid based on the calculated values for the remaining multiple horizontal dimensions and the received value for the selected one of the multiple horizontal dimensions; and causing the second layout grid to render in the GUI as a pixel-aligned layout grid.

In some examples, the received first input quantifies number of columns, and the calculated respective values quantify column width, gutter width, and margin width. In other examples, the received first input quantifies column width, and the calculated respective values quantify number of columns, gutter width, and margin width. In still other examples, the received first input quantifies gutter width, and the calculated respective values quantify number of columns, column width, and margin width. In yet other examples, the received first input quantifies margin width, and the calculated respective values quantify number of columns, column width, and gutter width. In further examples, the second layout grid is caused to render in a design canvas, and the process may also include: receiving a second input via the GUI, wherein the second input resizes a width of the design canvas; and responsive to receiving the second input, calculating respective values for the multiple horizontal dimensions based on the resized width of the design canvas such that values for each of the multiple horizontal dimensions is an integer value; generating a third layout grid based on the calculated values for the multiple horizontal dimensions; and causing the third layout grid to render in the resized design canvas as a pixel-aligned layout grid. In still further examples, the first layout grid includes a left margin and a right margin, and wherein a width of the left margin and a width of the right margin being the same as the margin width. In yet further examples, the first layout grid includes a left margin and a right margin, and wherein a width of the left margin and a width of the right margin being different by one pixel, and further wherein one of the width of the left margin or the width of the right margin being the same as the margin width.

According to some examples, systems to generate a pixel-aligned layout grid are described. An example system may include: one or more non-transitory machine-readable mediums configured to store instructions; and one or more processors configured to execute the instructions stored on the one or more non-transitory machine-readable mediums. Execution of the instructions by the one or more processors may cause the one or more processors to: cause a first layout grid to render on a display; receive a first user input, wherein the first user input specifies a value for one or more but not all of at least four horizontal dimensions of the first layout grid, the four horizontal dimensions including a number of columns in the first layout grid, a column width of each column in the first layout grid, a gutter width of each gutter in the first layout grid, and a margin width of the first layout grid; and responsive to receipt of the first user input, calculate respective integer values for the remaining ones of the four horizontal dimensions based on the first user input, such that each of the values for the four horizontal dimensions is an integer value; generate a second layout grid based on the integer values for the four horizontal dimensions; and cause the second layout grid to render on the display as a pixel-aligned layout grid.

In some examples, the received first user input quantifies one of number of columns, a column width, a gutter width, and a margin width. In other examples, the second layout grid is caused to render in a design canvas, and the one or more non-transitory machine readable mediums further stores instructions that, in response to execution by the one or more processors, cause the one or more processors to: receive a second user input that resizes a width of the design canvas; and responsive to receipt of the second user input, calculate respective integer values for the four horizontal dimensions based on the resized width of the design canvas, such that each of the values for the four horizontal dimensions is an integer value; generate a third layout grid based on the integer values for the four horizontal dimensions; and cause the third layout grid to render in the resized design canvas as a pixel-aligned layout grid. In still other examples, the first layout grid includes a left margin and a right margin, and wherein a width of the left margin and a width of the right margin being the same as the margin width.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer-implemented method to generate a pixel-aligned layout grid, the method comprising:
   causing a first layout grid to render on a display, wherein the first layout grid is defined by an initial value for each of four horizontal parameters including an initial number of columns, an initial column width of each column, an initial gutter width of each gutter, and an initial margin width;
   receiving a first user input, wherein the first user input specifies an updated value for one of the four horizontal parameters of the first layout grid;
   calculating updated values for the remaining three horizontal parameters based on the first user input, such that each of the updated values for the four horizontal parameters is an integer value;
   generating a second layout grid based on the updated values for the four horizontal parameters; and
   causing the second layout grid to render on the display as a pixel-aligned layout grid.

2. The method of claim 1, wherein the received first user input quantifies an updated number of columns, and the calculated updated values quantify an updated column width, an updated gutter width, and an updated margin width.

3. The method of claim 1, wherein the received first user input quantifies an updated column width, and the calculated respective integer values quantify an updated number of columns, an updated gutter width, and an updated margin width.

4. The method of claim 1, wherein the received first user input quantifies an updated gutter width, and the calculated respective integer values quantify an updated number of columns, an updated column width, and an updated margin width.

5. The method of claim 1, wherein the received first user input quantifies an updated margin width, and the calculated respective integer values quantify an updated number of columns, an updated column width, and an updated gutter width.

6. The method of claim 1, wherein the second layout grid is caused to render in a design canvas, the method further comprising:
   receiving a second user input that specifies a resized width of the design canvas; and
   responsive to receiving the second user input,
      calculating second updated values for the four horizontal parameters based on the resized width of the design canvas, such that each of the second updated values for the four horizontal parameters is an integer value;
      generating a third layout grid based on the second updated values for the four horizontal; and
      causing the third layout grid to render in the design canvas having the resized width as a modified pixel-aligned layout grid.

7. The method of claim 1, wherein
   the first layout grid includes a left margin and a right margin, and
   a width of the left margin and a width of the right margin are equal to the initial margin width.

8. The method of claim 1, wherein
the first layout grid includes a left margin and a right margin,
receiving the first user input quantifies an updated margin width,
calculating the updated values for the remaining three horizontal parameters includes calculating a modified margin width of either the left margin or the right margin, and
the modified margin width is different by one pixel from the updated margin width.

9. The method of claim 1, further comprising:
displaying the initial values for the four horizontal parameters before receiving the first user input; and
displaying the updated values for the four horizontal parameters after generating the second layout grid.

10. A computer program product including one or more non-transitory machine-readable mediums encoded with instructions that when executed by one or more processors cause a process to be carried out to generate a pixel-aligned layout grid, the process comprising:
causing, by a design application, a first layout grid to render in a graphical user interface (GUI), wherein the GUI comprises a plurality of text fields for specifying values for a plurality of horizontal parameters of the first layout grid, the plurality of horizontal parameters including an initial number of columns, an initial column width of each column, an initial gutter width of each gutter, and an initial;
receiving, by the GUI, a first input specifying an updated value for a one of the horizontal parameters;
calculating, by a layout generator, updated values for the remaining three horizontal parameters based on the first input such that each of the calculated updated values is an integer value;
generating, by the layout generator, a second layout grid based on the updated values for the four horizontal parameters; and
causing, by the design application, the second layout grid to render in the GUI as a pixel-aligned layout grid.

11. The computer program product of claim 10, wherein the received first input quantifies an updated number of columns, and the calculated updated values quantify an updated column width, an updated gutter width, and an updated margin width.

12. The computer program product of claim 10, wherein the received first input quantifies an updated column width, and the calculated updated values quantify an updated number of columns, an updated gutter width, and an updated margin width.

13. The computer program product of claim 10, wherein the received first input quantifies an updated gutter width, and the calculated updated values quantify an updated number of columns, an updated column width, and an updated margin width.

14. The computer program product of claim 10, wherein the received first input quantifies an updated margin width, and the calculated updated values quantify an updated number of columns, an updated column width, and an updated gutter width.

15. The computer program product of claim 10, wherein the second layout grid is caused to render in a design canvas, and wherein the process further comprises:
receiving, by the GUI, a second input that specifies a resized width of the design canvas; and
responsive to receiving the second input,
calculating, by the layout grid generator, second updated values for the plurality of horizontal parameters based on the resized width of the design canvas such that each of the second updated values for each of the plurality of horizontal parameters is an integer value;
generating, by the layout grid generator, a third layout grid based on the second updated values for the plurality of horizontal parameters; and
causing, by the design application, the third layout grid to render in the design canvas having the resized width as a modified pixel-aligned layout grid.

16. The computer program product of claim 10, wherein the first layout grid includes a left margin and a right margin, and
a width of the left margin and a width of the right margin are equal to the initial margin width.

17. The computer program product of claim 10, wherein the first layout grid includes a left margin and a right margin,
receiving the first input quantifies an updated margin width,
calculating the updated values for the remaining three horizontal parameters includes calculating a modified margin width of either the left margin or of the right margin, and
the modified margin width is different by one pixel from the updated margin width.

18. A system to generate a pixel-aligned layout grid, the system comprising:
one or more non-transitory machine-readable mediums configured to store instructions; and
one or more processors configured to execute the instructions stored on the one or more non-transitory machine-readable mediums, wherein execution of the instructions causes the one or more processors to
cause a first layout grid to render on a display;
receive a first user input, wherein the first user input specifies a value for one or more but not all of at least four horizontal dimensions of the first layout grid, the four horizontal dimensions including a number of columns in the first layout grid, a column width of each column in the first layout grid, a gutter width of each gutter in the first layout grid, and a margin width of the first layout grid;
responsive to receipt of the first user input,
calculate respective integer values for the remaining ones of the four horizontal dimensions based on the first user input, such that each of the values for the four horizontal dimensions is an integer value;
generate a second layout grid based on the integer values for the four horizontal dimensions; and
cause the second layout grid to render on the display as a pixel-aligned layout grid, wherein the second layout grid is caused to render in a design canvas;
receive a second user input that resizes a width of the design canvas;
responsive to receipt of the second user input,
calculate updated integer values for the four horizontal dimensions based on the resized width of the design canvas;
generate a third layout grid based on the updated integer values for the four horizontal dimensions; and
cause the third layout grid to render in the design canvas as a modified pixel-aligned layout grid.

19. The system of claim 18, wherein the received first user input quantifies one of an updated number of columns, an updated column width, an updated gutter width, and an updated margin width.

20. The system of claim 18, wherein the first layout grid includes a left margin and a right margin, and wherein a width of the left margin and a width of the right margin being the same as the margin width.

* * * * *